(12) United States Patent
Hong et al.

(10) Patent No.: US 10,175,826 B2
(45) Date of Patent: Jan. 8, 2019

(54) TOUCH DEVICE AND DISPLAY DEVICE INCLUDING THE SAME

(71) Applicant: Samsung Display Co., Ltd., Yongin, Gyeonggi-Do (KR)

(72) Inventors: Won-Ki Hong, Suwon-si (KR); Jong Seo Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 335 days.

(21) Appl. No.: 14/928,929

(22) Filed: Oct. 30, 2015

(65) Prior Publication Data

US 2016/0259487 A1 Sep. 8, 2016

(30) Foreign Application Priority Data

Mar. 3, 2015 (KR) .................. 10-2015-0030006

(51) Int. Cl.
*G06F 3/043* (2006.01)
*G06F 3/0488* (2013.01)
(Continued)

(52) U.S. Cl.
CPC .......... *G06F 3/0436* (2013.01); *G06F 1/1626* (2013.01); *G06F 1/1643* (2013.01);
(Continued)

(58) Field of Classification Search
CPC .... G06F 3/0436; G06F 1/1626; G06F 3/0485; G06F 3/04845; G06F 3/0416;
(Continued)

(56) References Cited

U.S. PATENT DOCUMENTS 5,509,114 A * 4/1996 Moran ............... G06F 3/04883
345/443
5,717,434 A * 2/1998 Toda ..................... G06F 3/0436
345/177
(Continued)

FOREIGN PATENT DOCUMENTS

JP 2007-026463 2/2007
KR 10-2011-0038846 4/2011
(Continued)

*Primary Examiner* — Patrick Edouard
*Assistant Examiner* — Joseph Fox
(74) *Attorney, Agent, or Firm* — Innovation Counsel LLP

(57) ABSTRACT

A touch device and a display device including the same are provided. The touch device includes: a first substrate; a second substrate facing the first substrate, and disposed to be spaced apart from the first substrate by a predetermined interval; a third substrate connecting first end portions of the first and second substrates to each other, and propagating an ultrasonic signal propagated along the first substrate to the second substrate; a plurality of first ultrasonic transducers connected to second portions facing the first end portions in the first substrate, and propagating an ultrasonic signal to the first substrate; and a plurality of second ultrasonic transducers connected to the second portions facing the first end portions in the second substrate, and receiving an ultrasonic signal propagated along the second substrate, wherein a touch point may be detected based on signal intensity variations of ultrasonic signals received by the second ultrasonic transducers.

21 Claims, 33 Drawing Sheets

(51) Int. Cl.
*G06F 1/16* (2006.01)
*G06F 3/041* (2006.01)
*G06F 3/0484* (2013.01)
*G06F 3/0485* (2013.01)

(52) U.S. Cl.
CPC .......... *G06F 3/0416* (2013.01); *G06F 3/0485* (2013.01); *G06F 3/04845* (2013.01); *G06F 3/04883* (2013.01); *G06F 3/04886* (2013.01); G06F 3/043 (2013.01); G06F 2203/04102 (2013.01); G06F 2203/04104 (2013.01); G06F 2203/04808 (2013.01)

(58) Field of Classification Search
CPC .............. G06F 3/04886; G06F 1/1643; G06F 3/04883; G06F 3/043; G06F 2203/04102; G06F 2203/04808; G06F 2203/04104; G06F 3/0433
See application file for complete search history.

(56) References Cited

U.S. PATENT DOCUMENTS

| | | | |
|---|---|---|---|
| 2005/0146514 A1* | 7/2005 | Kent | G06F 3/0436 345/173 |
| 2007/0229479 A1* | 10/2007 | Choo | G06F 3/0436 345/177 |
| 2008/0036743 A1* | 2/2008 | Westerman | G06F 3/038 345/173 |
| 2009/0153519 A1* | 6/2009 | Suarez Rovere | G06F 3/0421 345/173 |
| 2010/0078231 A1 | 4/2010 | Yeh et al. | |
| 2010/0194705 A1* | 8/2010 | Kim | G06F 1/1626 345/173 |
| 2011/0175821 A1* | 7/2011 | King | G06F 3/04883 345/173 |
| 2011/0234545 A1* | 9/2011 | Tanaka | G06F 3/0436 345/177 |
| 2013/0100079 A1* | 4/2013 | Chang | G06F 3/0412 345/175 |
| 2013/0225236 A1* | 8/2013 | Lee | G06F 3/0488 455/556.1 |
| 2015/0301641 A1* | 10/2015 | Sultenfuss | H04R 7/045 345/177 |

FOREIGN PATENT DOCUMENTS

| | | |
|---|---|---|
| KR | 10-2013-0029382 | 3/2013 |
| KR | 10-2014-0060259 | 5/2014 |

* cited by examiner

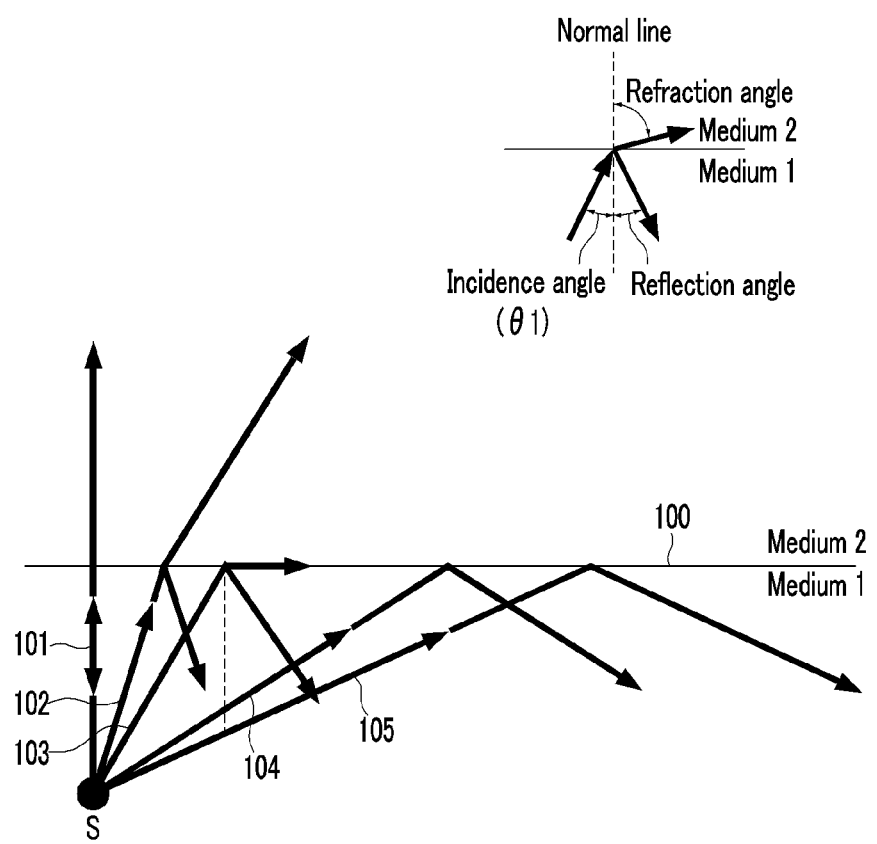

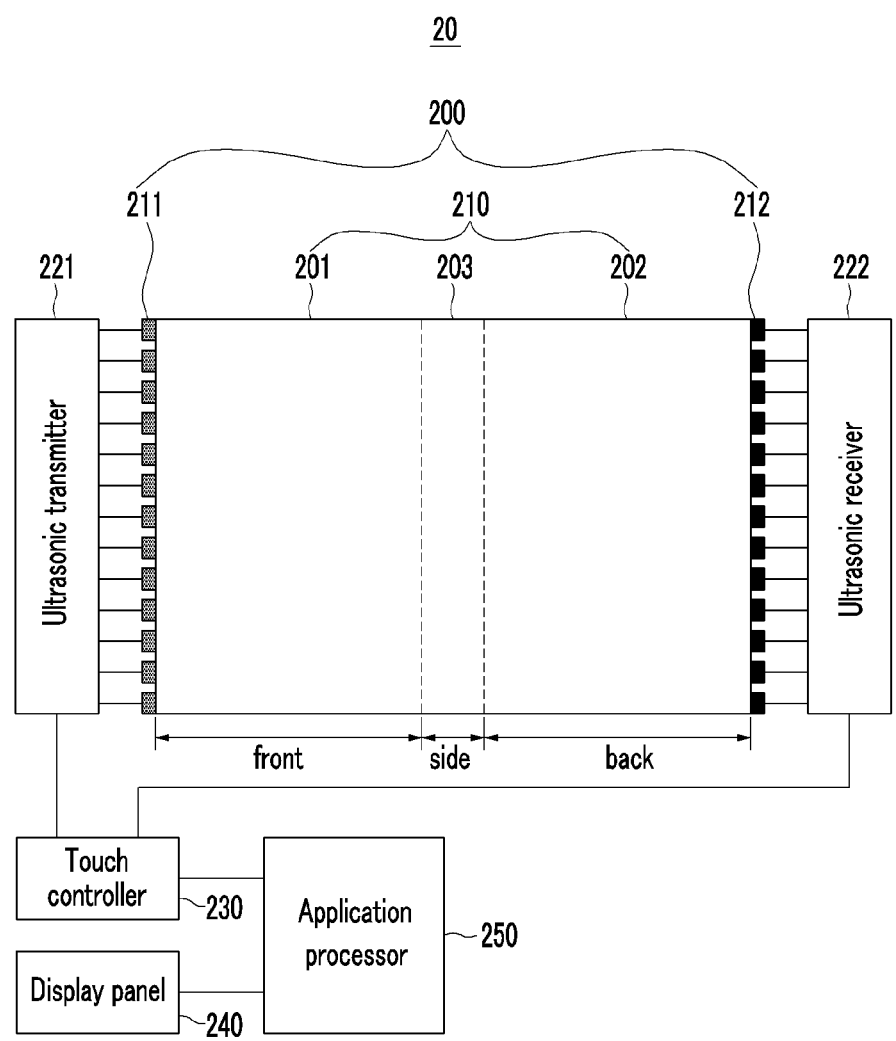

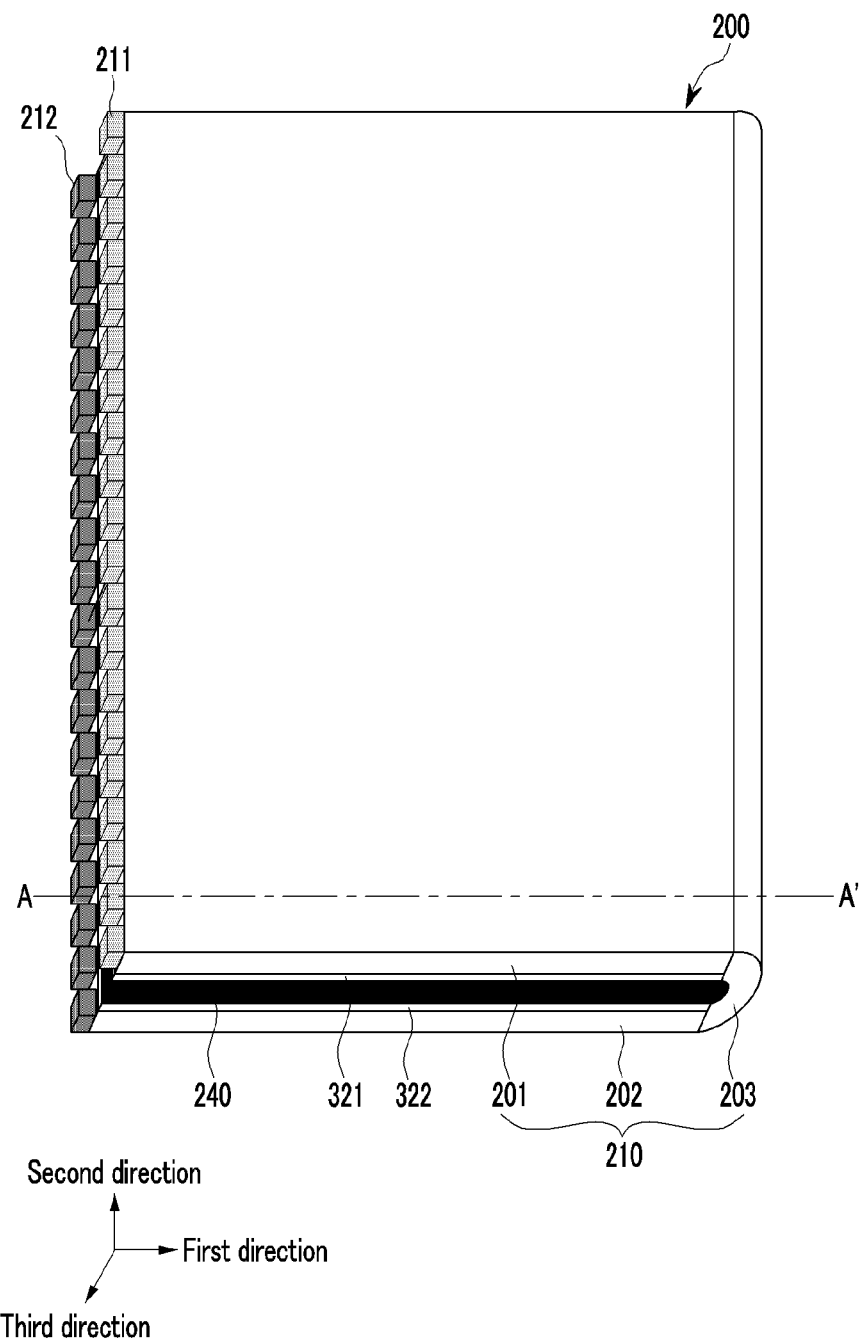

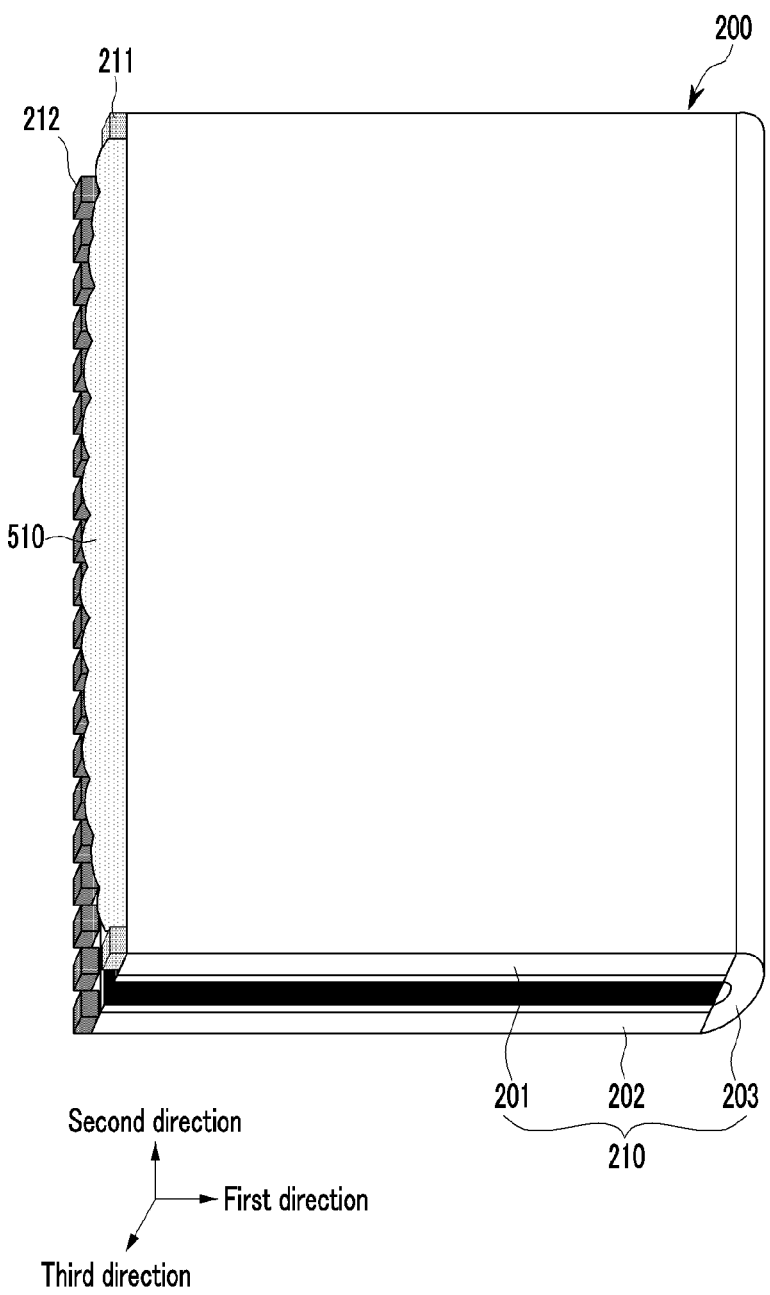

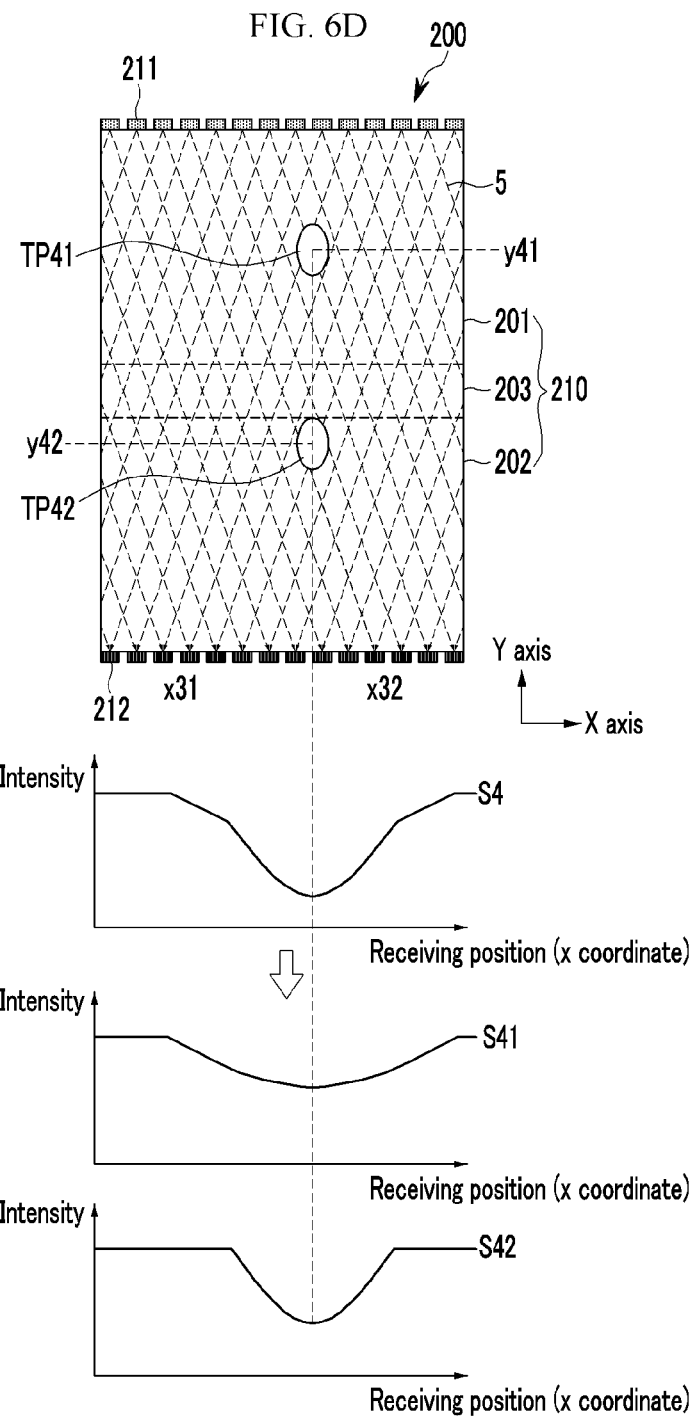

FIG. 11A
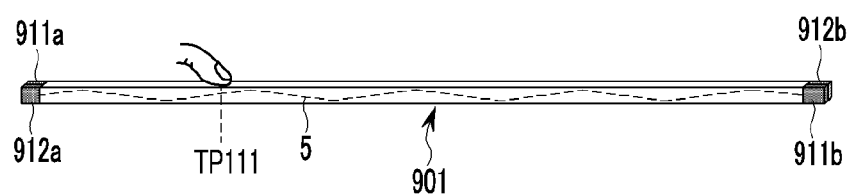
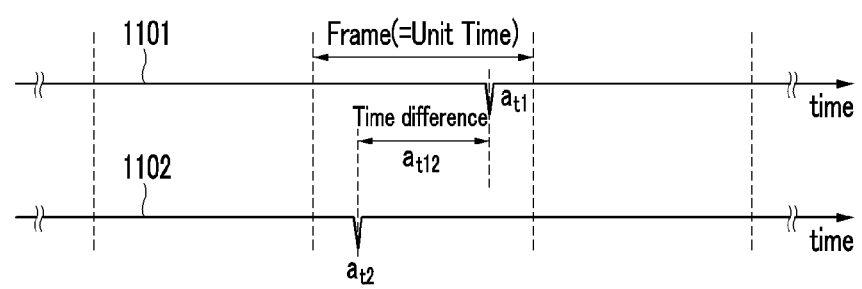

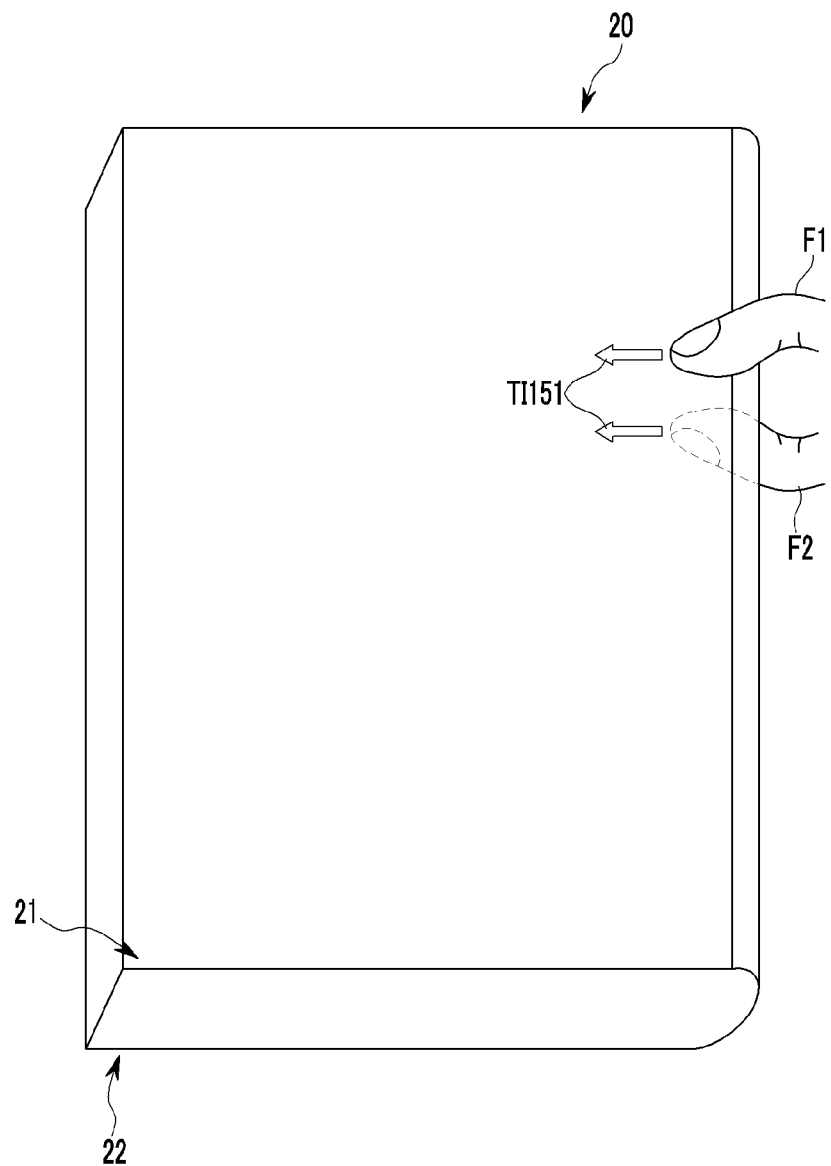

TOUCH DEVICE AND DISPLAY DEVICE INCLUDING THE SAME

CROSS-REFERENCE TO RELATED APPLICATION

This application claims priority to and the benefit of Korean Patent Application No. 10-2015-0030006 filed in the Korean Intellectual Property Office on Mar. 3, 2015, the entire contents of which are incorporated herein by reference.

BACKGROUND (a) Field

The present inventive concept relates to a touch device and a display device including the same. More particularly, the present inventive concept relates to a touch device and a display device including the same that enable a multiple surface touch.

(b) Description of the Related Art

A touch device integrated or combined to a display device provides an interaction system to the display device. In the display device, when a graphic image is displayed on a display panel, a user may touch a screen of the display device (using an active stylus, a passive stylus, or a part of his or her body such as a finger) to interact with the display device, thereby providing an intuitive user interface.

Recently, display devices that enable a touch input on a back or lateral surface as well as on a front surface have been developed. When a typical touch panel such as a capacitive, resistive, or pressure sensitive type is applied to the display device, in order to enable a multiple surface touch (or a multiple surface touch input), it is required that a touch panel be provided in each surface of the display device to receive a touch input. Further, a plurality of touch sensing drivers are required to separately drive the touch panels provided in multiple surfaces. Increment of the touch panels and the drivers for supporting a multiple surface touch increases size and cost of the display device. Further, when a multiple surface touch is applied to a transparent display, transmittance may deteriorate due to a touch panel, and since electrode patterns of the touch panel are viewed by a user, visibility may deteriorate.

The above information disclosed in this Background section is only for enhancement of understanding of the background of the inventive concept and therefore it may contain information that does not form the prior art.

SUMMARY

The present inventive concept has been made in an effort to provide a touch device and a display device including the same that enable a multiple surface touch.

An exemplary embodiment of the present inventive concept provides a touch device including: a first substrate; a second substrate facing the first substrate, and disposed to be spaced apart from the first substrate by a predetermined interval; a third substrate connecting first end portions of the first and second substrates to each other, and propagating an ultrasonic signal along the first substrate to the second substrate; a plurality of first ultrasonic transducers connected to second portions facing the first end portions in the first substrate, and propagating an ultrasonic signal to the first substrate; and a plurality of second ultrasonic transducers connected to the second portions facing the first end portions in the second substrate and receiving an ultrasonic signal propagated along the second substrate, wherein a touch point may be detected based on signal intensity variations of ultrasonic signals received by the second ultrasonic transducers.

A display device according to an exemplary embodiment of the present inventive concept includes the touch device and a display panel, wherein a front surface, a back surface, and one lateral surface of the display panel may be covered by the first, second, and third substrates of the touch device.

Another embodiment of the present inventive concept provides: a waveguide, as a medium propagating an ultrasonic signal, disposed in a zigzag form to cover at least two surfaces connected to each other in a panel; a first inter-digital transducer and a second inter-digital transducer respectively combined with a first end portion and a second end portion of the waveguide, and propagating the ultrasonic signal to the first end portion and the second end portion; and a first ultrasonic receiving transducer and a second ultrasonic receiving transducer respectively combined with the first end portion and the second end portion, and receiving an ultrasonic signal propagated along the waveguide, wherein a touch point is detected based on a time difference between a first time point at which a signal intensity variation of greater than or equal to a threshold value in an ultrasonic signal received by the first ultrasonic receiving transducer is detected and a second time point at which the signal intensity variation of greater than or equal to the threshold value in an ultrasonic signal received by the second ultrasonic receiving transducer is detected.

According to an embodiment of the present inventive concept, it is possible to minimize a cost increase due to a configuration for the multiple surface touches by one touch panel covering the front, back, and at least one lateral surface of the display panel, and by one driver driving the touch panel.

In addition, since transparent electrodes and metal electrodes of the touch panel are not formed on the display panel, transmittance deterioration due to the touch electrodes or moiré due to regularity of the touch electrodes may be prevented.

Further, since the touch input on the lateral surface or the back surface of the display device may be performed, it is possible to execute a touch gesture regardless of information being displayed on the display surface.

Further, it is possible to provide various and intuitive user interfaces by applying the multiple surface touch.

BRIEF DESCRIPTION OF THE DRAWINGS

FIG. 1A is a schematic diagram for explaining a total reflection condition of an ultrasonic signal.

FIG. 2 is a schematic block diagram of a display device according to a first exemplary embodiment of the present inventive concept.

FIG. 3A is a schematic perspective view of a touch panel 200 according to the first exemplary embodiment of the present inventive concept.

FIG. 5A illustrates another exemplary variation of the touch panel 200 according to the first exemplary embodiment of the present inventive concept.

FIGS. 6A, 6B, 6C and FIG. 6D are schematic diagrams for explaining a method of obtaining a touch coordinate (value) in the touch device according to the first exemplary embodiment of the present inventive concept.

FIGS. 11A, 11B and 11C are schematic diagrams illustrating methods of obtaining touch coordinate values by the touch device according to the second exemplary embodiment of the present inventive concept.

FIGS. 14, 15A and 15B illustrate examples of providing a user interface for touch inputs on both surfaces in the display device according to the exemplary embodiments of the present inventive concept.

DETAILED DESCRIPTION OF THE EMBODIMENTS

Figure 1B:
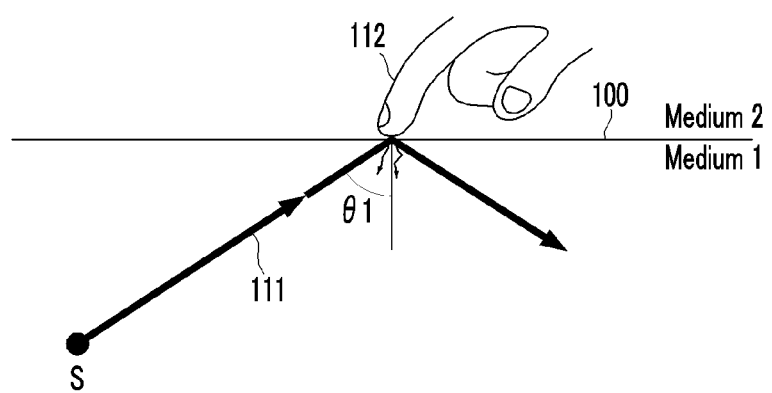
FIG. 1B is a schematic diagram for explaining a touch detecting method using an ultrasonic signal according to an exemplary embodiment of the present inventive concept.

Hereinafter, an exemplary embodiment of the present inventive concept will be described in detail with reference to the attached drawings such that the present inventive concept can be easily put into practice by those skilled in the art. As those skilled in the art would realize, the described embodiments may be modified in various different ways, all without departing from the spirit or scope of the present inventive concept.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1A is a schematic diagram for explaining a total reflection condition of an ultrasonic signal.

Referring to FIG. 1A, ultrasonic signals (101, 102, 103, 104, and 105) outputted from an ultrasonic source S are refracted or reflected depending on an incidence angle θ1 to boundary surfaces 100 of a medium 1 and a medium 2 having different acoustic impedances.

At least part of the ultrasonic signal 102 incidents to the boundary surface 100 at a smaller incidence angle than a critical incidence angle is refracted on the boundary surface 100 and proceeds to the medium 2.

At least part of the ultrasonic signal 103 incidents to the boundary surface 100 at the critical incidence angle is refracted on the boundary surface 100 at a 90° angle of refraction and proceeds in parallel with a boundary of the first medium (Medium 1) and the second medium (Medium 2).

At least part of the ultrasonic signals 103, 104, and 105 that are incident to the boundary surface 100 at an incidence angle equal to or greater than the critical incidence angle is reflected at the boundary surface 100 at a reflecting angle equal to the incidence angle and proceeds to the medium 1.

The ultrasonic signals 104 and 105 incident to the boundary surface 100 at a greater incidence angle than the critical incidence angle are totally reflected at the boundary surface 100, and proceed to the medium 1. That is, energy of the ultrasonic signals 104 and 105 incident to the boundary surface 100 at the greater incidence angle than the critical incidence angle are totally reflected at the boundary surface 100 in an ideal condition.

When the medium 1 and the medium 2 are glass and air, respectively, an ultrasonic signal is refracted on the boundary surface 100 at a refraction angle of 50° when the ultrasonic signal is incident thereto at an incidence angle of 10°. Further, when the ultrasonic signal is incident to the boundary surface 100 at 15°, the ultrasonic signal is refracted on the boundary surface 100 at 90° and proceeds in parallel with the boundary surface 100 between the mediums 1 and 2.

When the medium 1 and the medium 2 are glass and air, respectively, and a critical incidence angle of an ultrasonic signal is 15°, the ultrasonic signal is totally reflected without refraction when the ultrasonic signal is incident at an angle of greater than 15°.

An exemplary embodiment of the present inventive concept senses a touch signal using transmitting characteristics of an ultrasonic signal.

FIG. 1B is a schematic diagram for explaining a touch detecting method using an ultrasonic signal according to an exemplary embodiment of the present inventive concept.

Referring to FIG. 1B, an ultrasonic signal 111 outputted from an ultrasonic source S is incident to a boundary surface 100 of a medium 1 and a medium 2 having different acoustic impedances at an incidence angle θ1 that is greater than a critical incidence angle. Accordingly, the ultrasonic signal 111 is totally reflected at the boundary surface 100, and propagates to the medium 1.

In this case, when a user's finger 112 is touched the boundary surface 100 of the two mediums, that is, the surface of the medium 1, the total reflection of the ultrasonic signal 111 is disturbed by the user's finger 112, such that energy of the ultrasonic signal is leaked. Accordingly, while the ultrasonic signal 111 is reflected on the boundary surface 100, energy loss due to a touch may occur.

Energy of the ultrasonic signal may be obtained by measuring intensity of the ultrasonic signal. Accordingly, in the exemplary embodiment of the present inventive concept, a receiver receiving the ultrasonic signal detects intensity of the ultrasonic signal propagated through the medium 1, and determines whether a touch has occurred based on the detected intensity.

Hereinafter, a touch device and a display device including the touch device according to a first exemplary embodiment of the present inventive concept will be described in detail with reference to FIGS. 2 to 8.

Figure 3B:
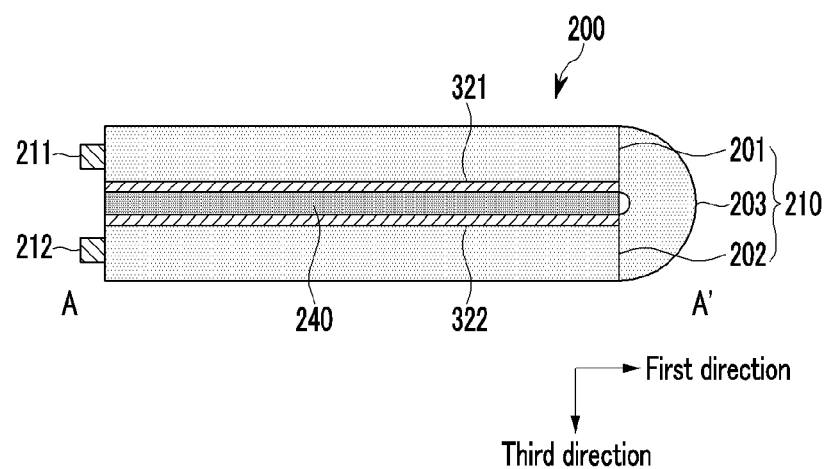
FIG. 3B is a schematic cross-sectional view of the touch panel 200 according to the first exemplary embodiment of the present inventive concept.
Figure 3C:
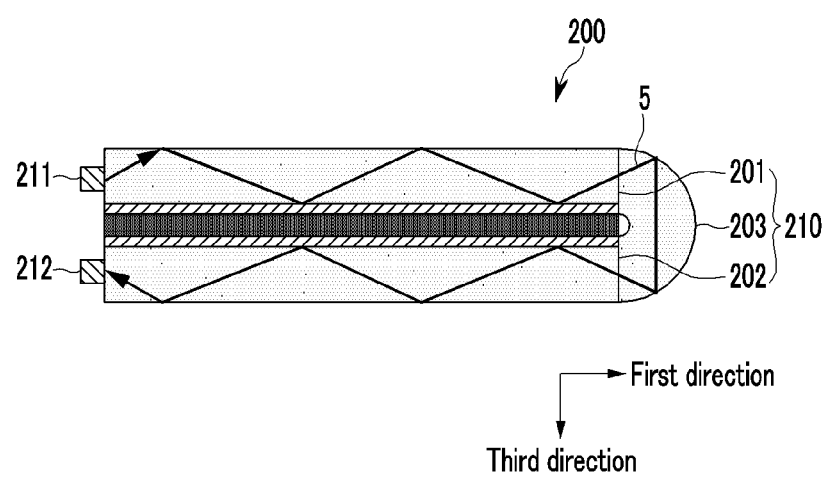
FIG. 3C schematically illustrates a path of an ultrasonic signal propagated along a waveguide in the touch panel 200 according to the first exemplary embodiment of the present inventive concept.
Figure 4:
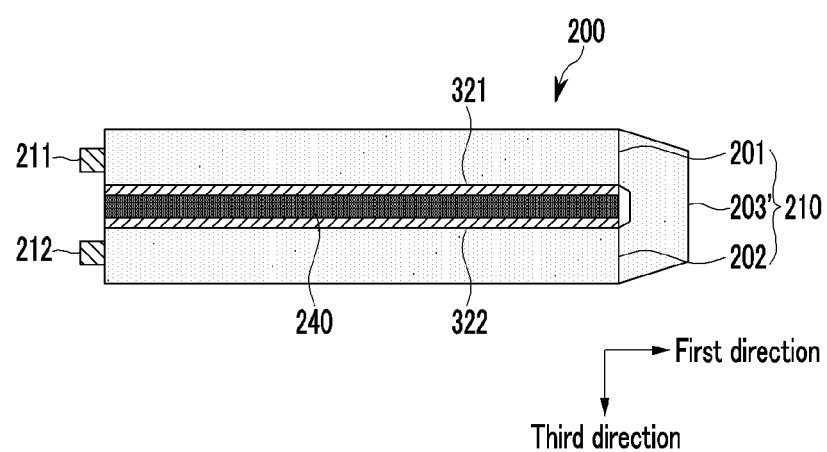
FIG. 4 illustrates an exemplary variation of the touch panel 200 according to the first exemplary embodiment of the present inventive concept.
Figure 5B:
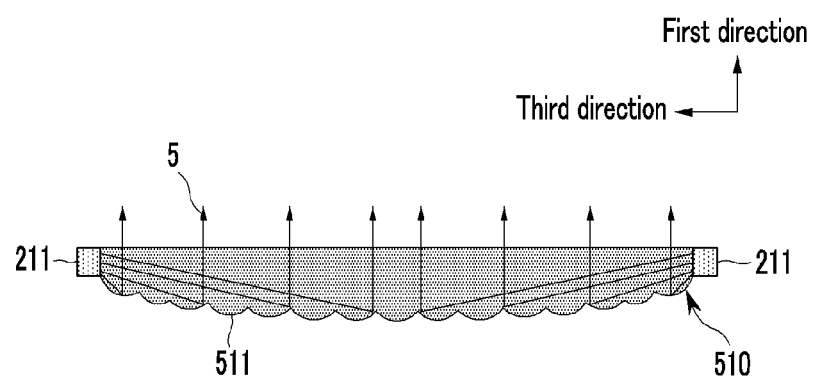
FIGS. 5B, 5C and 5D are schematic diagrams for explaining a guide bar included in the touch panel 200 shown in FIG. 5A.
Figure 5C:
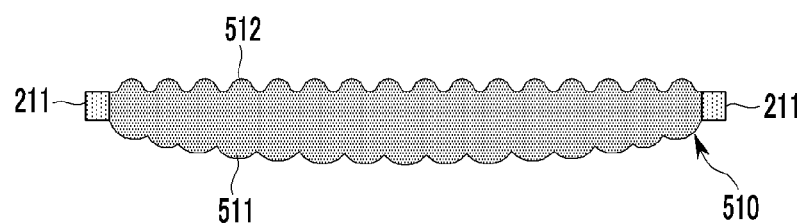
Figure 5D:
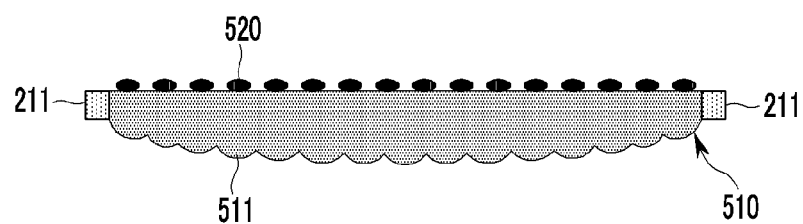
Figure 7:
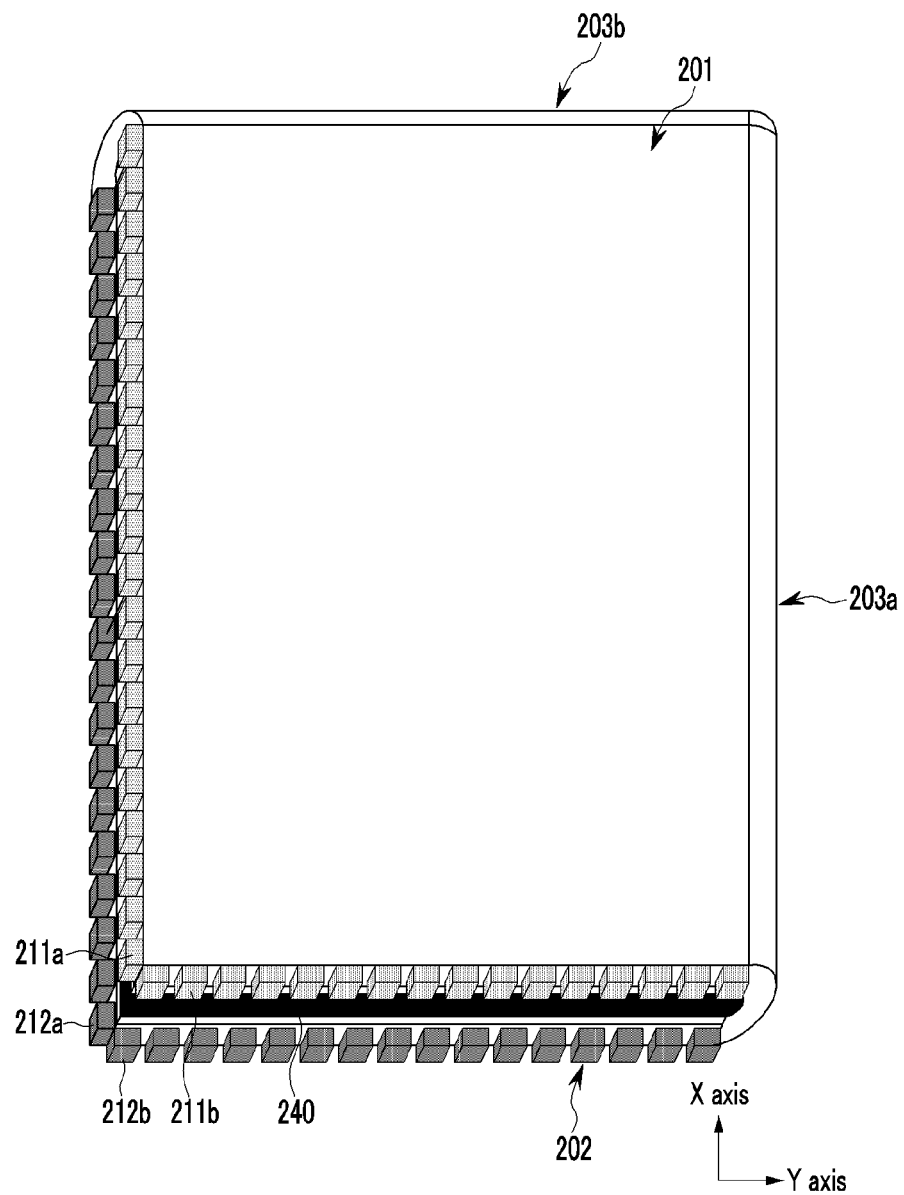
FIG. 7 illustrates a further exemplary variation of the touch panel 200 according to the first exemplary embodiment of the present inventive concept.
Figure 8:
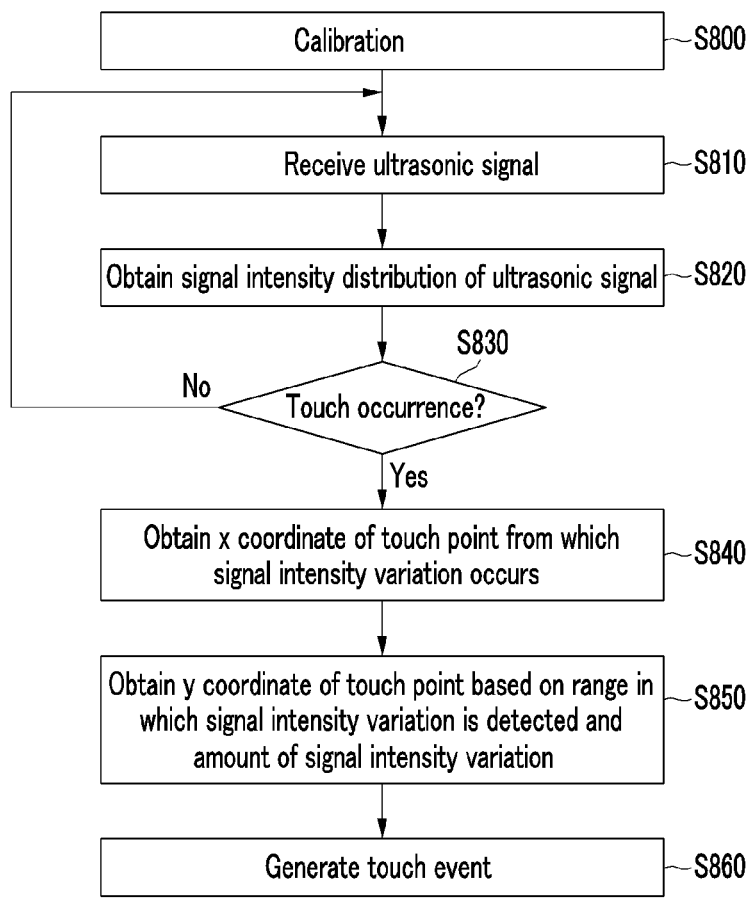
FIG. 8 is a flowchart of a touch detecting method of a touch device according to an exemplary embodiment of the present inventive concept.

FIG. 2 is a schematic block diagram of a display device according to a first exemplary embodiment of the present inventive concept. FIG. 3A is a schematic perspective view of a touch panel 200 according to the first exemplary embodiment of the present inventive concept, and FIG. 3B is a schematic cross-sectional view of the touch panel 200 according to the first exemplary embodiment of the present inventive concept. FIG. 3C schematically illustrates a path of an ultrasonic signal propagated along a waveguide in the touch panel 200 according to the first exemplary embodiment of the present inventive concept. FIGS. 4, 5A, and 7 illustrate exemplary variations of the touch panel 200 according to a first exemplary embodiment of the present inventive concept, respectively. FIGS. 5B to 5D are schematic diagrams for explaining a guide bar included in the touch panel 200 shown in FIG. 5A. FIGS. 6A to 6D are schematic diagrams for explaining a method for obtaining a touch coordinate in the touch device according to the first exemplary embodiment of the present inventive concept. FIG. 8 is a flowchart of a touch detecting method of a touch device according to an exemplary embodiment of the present inventive concept.

Referring to FIG. 2, a display device 20 according to the first exemplary embodiment of the present inventive concept may include a touch device, a display panel 240, and an application processor 250.

Further, the touch device according to the first exemplary embodiment of the present inventive concept includes a touch panel 200 that includes a waveguide 210, an inter-digital transducer (IDT) 211, and an ultrasonic receiving transducer 212, an ultrasonic transmitter 221, an ultrasonic receiver 222, and a touch controller 230. The touch device according to the first exemplary embodiment of the present inventive concept is not limited to constituent elements shown in FIG. 2, and may include more or fewer constituent elements than constituent elements shown in FIG. 2.

The waveguide 210 includes a front waveguide 201, a back waveguide 202, and a bridge waveguide 203. The front waveguide 201, the back waveguide 202, and the bridge waveguide 203 are mediums through which an ultrasonic signal may be propagated.

For better understanding and ease of description, although the waveguide 210 of the touch panel 200 is show in an unfolded state in FIG. 2, the waveguide 210 according to the exemplary embodiment of the present inventive concept may be folded to surround a front surface, a back surface, and at least one side surface of the display panel 240.

Referring to FIGS. 3A and 3B, the front waveguide 201 and the back waveguide 202 have a plate shape, and are disposed to be spaced apart from each other by a predetermined interval while facing each other. The display panel 240 is interposed between the front waveguide 201 and the back waveguide 202. The front waveguide 201 is disposed to face the front surface of the display panel 240 to cover the front surface of the display panel 240. The back waveguide 202 is disposed to face the back surface of the display panel 240 to cover the back surface of the display panel 240. The front and back waveguides 201 and 202 guide an ultrasonic signal so that the ultrasonic signal may be propagated along the front and back surfaces of the display panel 240.

Assistant layers 321 and 322 are respectively provided at a surface of the front waveguide 201 contacting the display panel 240 and at a surface of the back waveguide 202 contacting the display panel 240. The assistant layers 321 and 322 may be made of a material with different acoustic impedance from that of the front waveguide 201 or the back waveguide 202 by a predetermined value so that the ultrasonic signal may propagated within the waveguide 210 of the touch device.

The bridge waveguide 203 connects one end portion of the front waveguide 201 and one end portion of the back waveguide 202, and propagates an ultrasonic signal passing through the front waveguide 201 toward the back waveguide 202.

The bridge waveguide 203 is formed to surround at least one lateral surface of the display panel 240. Accordingly, the ultrasonic signal passing through the front waveguide 201 may be propagated to the bridge waveguide 203. Further, the ultrasonic signal propagated to the bridge waveguide 203 is propagated along the one lateral surface of the display panel 240 by the bridge waveguide 203 to be transmitted to the back waveguide 202.

Referring to FIG. 3C, when an ultrasonic signal 5 generated by the inter-digital transducer 211 passes through the front waveguide 201 and is incident on the bridge waveguide, the bridge waveguide 203 totally reflects the incident ultrasonic signal and guides the totally reflected ultrasonic signal in a thickness direction of the display panel 240, that is, a third direction. Further, the bridge waveguide 203 again totally reflects the ultrasonic signal 5 that is totally reflected in the thickness direction of the display panel 240 and propagates it to the back waveguide 202.

The bridge waveguide 203 may have various shapes, and may be formed to surround one lateral surface of the display panel 240. Further, the bridge waveguide 203 is formed in a shape such that it may totally reflect the ultrasonic signal 5 passing through the front waveguide 201, may guide the totally reflected ultrasonic signal in the third direction, and may again totally reflect the guided ultrasonic signal to be incident on the back waveguide 202 at a predetermined angle which is greater than the critical incidence angle.

As shown in FIGS. 3B and 3C, the bridge waveguide 203 may include an outer curved surface that connects an outer surface of the front waveguide 201 and an outer surface of the back waveguide 202 in a curved line form.

As shown in FIG. 4, a bridge waveguide 203' may include at least one outer flat surface that linearly connects the front waveguide 201 and the back waveguide 202.

The front waveguide 201, the back waveguide 202, and the bridge waveguide 203 are made of a medium with the same acoustic impedance so that ultrasonic signals may be propagated within the waveguide 210 of the touch panel 200.

Kinds of mediums forming the front waveguide 201, the back waveguide 202, and the bridge waveguide 203 is not limited, but a material of which the acoustic impedance differs from that of external air by more than a predetermined value may be used so that less loss of signal my occur when an ultrasonic signal is propagated.

When the display panel 240 is a transparent display panel, the front waveguide 201, the back waveguide 202, and the bridge waveguide 203 may be made of a transparent material. When the display panel 240 is an opaque display panel, the front waveguide 202 may be made of a transparent material, and the back waveguide 202 and the bridge waveguide 203 may be made of a transparent or opaque material.

The front waveguide 201, the back waveguide 202, and the bridge waveguide 203 may be made of glass, plastic, a polymer, or the like.

On the other hand, the front waveguide 201, the back waveguide 202, and the bridge waveguide 203 may be integrally formed. In this case, the front waveguide 201, the back waveguide 202, and the bridge waveguide 203 may be made by folding one substrate to cover a front surface, a back surface and at least one side surface of the display panel 240 as shown in FIG. 3A.

In addition, the front waveguide 201, the back waveguide 202, and the bridge waveguide 203 may be separately formed, and then be combined into one piece. In this case, after the front and back waveguides 201 and 202 are respectively formed in a plate shape, the bridge waveguide 203 may be combined with the front and back waveguides 201 and 202 to cover at least one side surface of the display panel 240 as shown in FIG. 3A.

In the specification, the front and back waveguides 201 and 202 that guide the ultrasonic signal in the touch panel 200 are illustrated to be provided separately from the display panel 240, but the exemplary embodiments of the present inventive concept are not limited thereto. That is, the waveguide of the touch panel 200 may be realized with some of constituent elements of the display panel such as a substrate, a cover window, and a cover lens of the display panel. In this case, since an increase in the thickness of a display device due to supplemental waveguide may be minimized, the thickness of the display device may decrease.

Referring back to FIGS. 2 and 3A, at least one inter-digital transducer (IDT) 211 is disposed at an end portion of the front waveguide 201 facing the bridge waveguide 203. The inter-digital transducer 211 may be an actuator that converts an electrical signal into a vibration signal to generate an ultrasonic signal. The inter-digital transducer 211 may include a piezoelectric substrate and an electrode formed on the piezoelectric substrate.

Referring to FIG. 3A, a plurality of inter-digital transducers 211 are disposed to be spaced apart from each other by a predetermined interval in a second direction along the end portion of the front waveguide 201. The inter-digital transducers 211 generate an ultrasonic signal and provide the generated ultrasonic signal to the end portion of the front waveguide 201. The ultrasonic signal generated by the inter-digital transducer 211 is propagated to the front waveguide 201.

The ultrasonic signal generated by the inter-digital transducer 211 is propagated along the front waveguide 201, the bridge waveguide 203, and the back waveguide 202.

At least one ultrasonic receiving transducer 212 is disposed at an end portion of the back waveguide 202 facing the bridge waveguide 203. Referring to FIG. 3A, a plurality of ultrasonic receiving transducers 212 are disposed to be spaced apart from each other by a predetermined interval in the second direction along the end portion of the back waveguide 202.

The ultrasonic receiving transducer 212 may be an actuator that converts a vibration signal which is an ultrasonic signal into an electrical signal. The ultrasonic receiving transducer 212 may include a piezoelectric substrate and an electrode formed on the piezoelectric substrate.

The ultrasonic receiving transducer 212 receives the vibration signal corresponding to the ultrasonic signal that is generated by the inter-digital transducer 211 and then is propagated along the front waveguide 201, the bridge waveguide 203, and the back waveguide 202. Further, after receiving the vibration signal, the ultrasonic receiving transducer 212 converts the received vibration signal into an electrical signal and then outputs the converted electrical signal to the touch controller 230.

In FIG. 3A, the inter-digital transducer 211 and the ultrasonic receiving transducer 212 are shown to be disposed in the same number, but the exemplary embodiment of the present inventive concept is not limited thereto. That is, the number of the inter-digital transducers 211 may be fewer than that of the ultrasonic receiving transducer 212.

In addition, the touch panel 200 may further include a guide bar so that ultrasonic signals generated by the inter-digital transducers 211 of the fewer number (e.g., two) may be propagated throughout an entire region of the waveguide 210. Referring to FIG. 5A, a guide bar 510 is disposed at both end portions of the front waveguide 201 facing the bridge waveguide 203. Two inter-digital transducers 211 are respectively disposed at opposite sides of the guide bar 510. The inter-digital transducers 211 disposed at the opposite sides of the guide bar 510 generate ultrasonic signals, and propagate the generated ultrasonic signals to the guide bar 510. Referring to FIG. 5B, a lens array 511 is provided at one surface of the guide bar 510 which does not face the front waveguide 201. A propagation path of the ultrasonic signal 5 propagated to the guide bar 510 by the inter-digital transducer 211 is changed in the first direction by the lens array 511 formed at an outer surface of the guide bar 510. Accordingly, the ultrasonic signal 5 generated by the inter-digital transducer 211 is spread and propagated throughout the entire region of the front waveguide 201. As shown in FIG. 5C, convex portions 512 with a convex lens shape may be formed at one surface of the guide bar 510 which faces the surface on which the lens array 511 is formed and faces the end portion of the front waveguide 201. Further, as shown in FIG. 5D, a plurality of convex lens 520 may be combined with the one surface of the guide bar 510 which faces the end portion of the front waveguide 201. The convex portion 512 or the convex lens 520 of the guide bar 510 serves to focus the ultrasonic signal in a thickness direction (a third direction) of the front waveguide 201 so that incident efficiency of the ultrasonic signal may be improved.

Referring back to FIG. 2, the ultrasonic transmitter 221 is connected to the plurality of inter-digital transducers 211. The ultrasonic transmitter 221 provides the inter-digital transducers 211 with a driving signal (driving voltage) to generate an ultrasonic signal.

The ultrasonic receiver 222 is connected to the plurality of ultrasonic receiving transducers 212. The ultrasonic receiver 222 processes electrical signals received through the ultrasonic receiving transducers 212 to generate touch signals. A gain of an electrical signal outputted from the ultrasonic receiving transducer 212 is determined depending on intensity of an ultrasonic signal received by the ultrasonic receiving transducer 212. That is, as the intensity of the ultrasonic signal received by the ultrasonic receiving transducer 212 is greater, the gain of the electrical signal outputted from the ultrasonic receiving transducer 212 increases. The ultrasonic receiver 222 generates a touch signal which includes distribution of intensity of ultrasonic signals depending on a receiving position according to electrical signals outputted from the ultrasonic receiving transducer 212.

The ultrasonic receiver 222 is connected to the touch controller 230. The ultrasonic receiver 222 outputs the touch signal to the touch controller 230. The touch signal is a digital signal which is obtained from an analog signal outputted from the ultrasonic receiving transducers 212.

The touch controller 230 processes a touch signal received from the ultrasonic receiver 222, and outputs a touch event such as a touch coordinate of a touch point to the application processor 250.

The touch controller 230 detects variation of intensity of the ultrasonic signal received by the ultrasonic receiving transducer 212 through the touch signal received by the ultrasonic receiver 222. Further, the touch controller 230 detects a position of the ultrasonic receiving transducer 212 in which variation of signal intensity sufficient for detection of the touch event occurs, and obtains the touch coordinates of the touch point based on the detected position.

The intensity of the ultrasonic signal detected by each ultrasonic receiving transducer 212 is varied depending on whether any point of the waveguide 210 in which the ultrasonic signal is propagated is touched.

When the touch point is changed in a direction parallel to arrangement of the ultrasonic receiving transducers 212, the position of the ultrasonic receiving transducer 212 that receives the ultrasonic signal of which the energy is lost due to a touch is changed. Accordingly, the touch controller 230 may detect an x coordinate (or a y coordinate) of the touch point based on the position of the ultrasonic receiving transducer 212 in which a signal intensity change greater than or equal to a threshold value is detected.

When the touch point is changed in a direction in which a distance from the ultrasonic receiving transducer 212 is changed, numbers of the ultrasonic receiving transducers 212 that receive the ultrasonic signal having reduced energy due to a touch and the signal intensity variation detected by the ultrasonic receiving transducer 212 are changed. For example, numbers of the ultrasonic receiving transducers 212 that receive the ultrasonic signals having reduced energy decrease when touch occurs closer to the ultrasonic receiving transducer 212. In addition, when the ultrasonic signal having reduced energy due to the touch is reduced, the intensity change of the ultrasonic signal received by the ultrasonic receiving transducers 212 increases.

Accordingly, the touch controller 230 detects the y coordinate of the touch point based on the number and the signal intensity variation of the ultrasonic receiving transducers 212 in which the signal intensity greater than or equal to the threshold value is detected.

The touch controller 230 may calculate a touch area of a touch means such as a finger and a stylus based on the touch signal. An area in which the signal intensity of greater than or equal to the threshold value is detected by the ultrasonic receiving transducer 212 is varied depending on an area that the touch means touches the waveguide 210. That is, the larger the touch area by the touch means, the larger the area in which the signal intensity variation of the ultrasonic signal is detected by the ultrasonic receiving transducer 212. Accordingly, the touch controller 230 may calculate the touch area depending on the size of the area in which the signal intensity variation of the ultrasonic signal is detected by the ultrasonic receiving transducer 212.

A method in which a touch controller 230 detects a touch coordinate will now be described in detail with reference to FIGS. 6A to 6D. FIGS. 6A to 6D graphically illustrate signal intensity of an ultrasonic signal received by each inter-digital transducer 212 when a touch occurs. That is, FIGS. 6A to 6D graphically illustrate the signal intensity of the ultrasonic signal depending on a receiving position at which the ultrasonic signal is received when the touch occurs. Further, FIGS. 6A to 6D illustrate a foldable waveguide 210 of a touch panel 200 in an unfolded state.

Figure 6A:
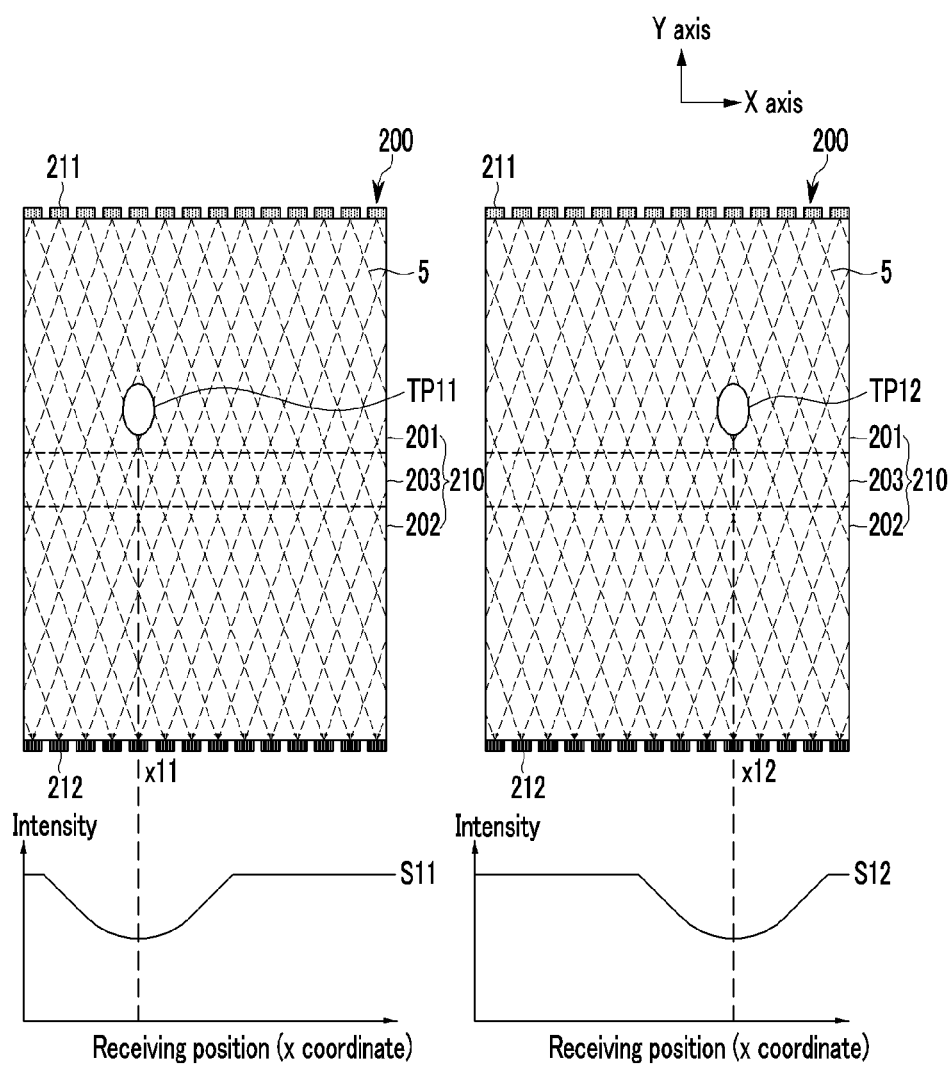

Referring to FIG. 6A, when a point TP11 corresponding to x11 of x coordinates is touched, a signal intensity variation is detected by at least one ultrasonic receiving transducer 212 disposed around a receiving position corresponding to x11 of the x coordinates. Similarly, when a point TP12 corresponding to x12 of x coordinates is touched, a signal intensity variation is detected by at least one ultrasonic receiving transducer 212 disposed around a receiving position corresponding to x12 of the x coordinates. Accordingly, the touch controller 230 may detect the x coordinate values of the touch points TP11 and TP12 based on positions of ultrasonic receiving transducers 212 in which a signal intensity variation of greater than or equal to a threshold value is detected.

The touch controller 230 may detect a center of a receiving position at which a signal intensity variation of greater than or equal to a threshold value is detected as an x coordinate value of a touch point. Further, the touch controller 230 may detect an x coordinate value of a touch point from a receiving position (a position of an inter-digital transducer 212) at which the greatest signal intensity variation occurs.

Figure 6B:
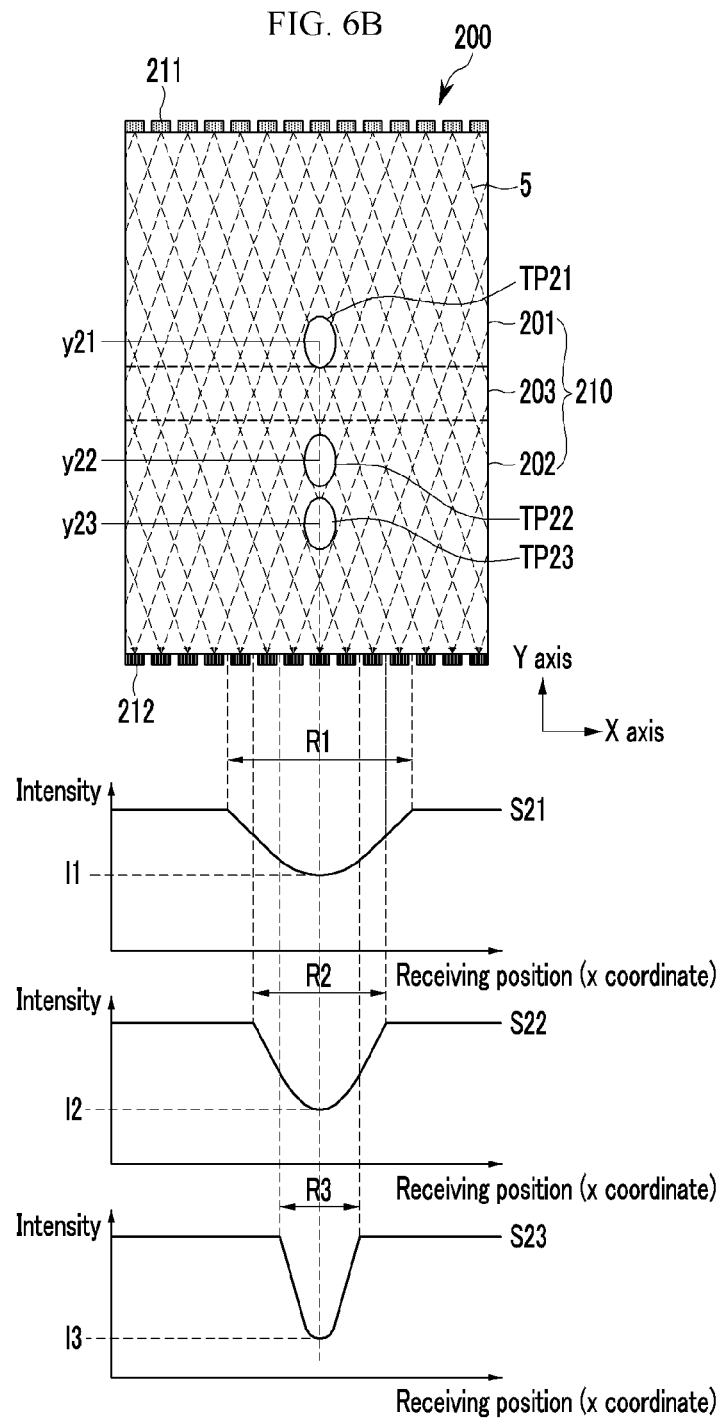

Referring to FIG. 6B, when points TP21, TP22, and TP23 that are different from each other in a y coordinate are touched, areas R1, R2, and R3 of the ultrasonic receiving transducers 212 in which a signal intensity variation of greater than or equal to a threshold value is detected are different from each other. That is, when the points TP21, TP22, and TP23 having different y coordinates are touched, numbers of the ultrasonic receiving transducers 212 in which the signal intensity variation of greater than or equal to the threshold value is detected may be different. As the y coordinate values of the touch point TP21, TP22, and TP23 are farther from the ultrasonic receiving transducer 212, a receiving range (or the number of ultrasonic receiving transducers 212) in which the signal intensity variation of greater than or equal to the threshold value is detected increases.

When the different y coordinate points TP21, TP22, and TP23 are touched, the signal intensity variations detected by the ultrasonic receiving transducers 212 are different from each other. As the y coordinate values of the touch points TP21, TP22, and TP23 are closer to the ultrasonic receiving transducer 212, the signal intensity variations of the ultrasonic signals detected by the ultrasonic receiving transducers 212 increase. Accordingly, the signal intensities I1, I2, and I3 of the ultrasonic signals detected by the ultrasonic receiving transducers 212 decrease as the coordinate values of the touch points TP21, TP22, and TP23 are closer to the ultrasonic receiving transducer 212.

Therefore, the touch controller 230 may detect the y coordinate (value) of the touch point based on the area in which the signal intensity variation of greater than or equal to the threshold value is detected in the ultrasonic receiving transducer 212 (the number of ultrasonic receiving transducers 212 at which the signal intensity variation of greater than or equal to the threshold value is detected) and the signal intensity variation in the ultrasonic receiving transducer 212.

In the present exemplary embodiment, the touch controller 230 may detect multiple touches through touch signals in the ultrasonic receiver 222.

Figure 6C:
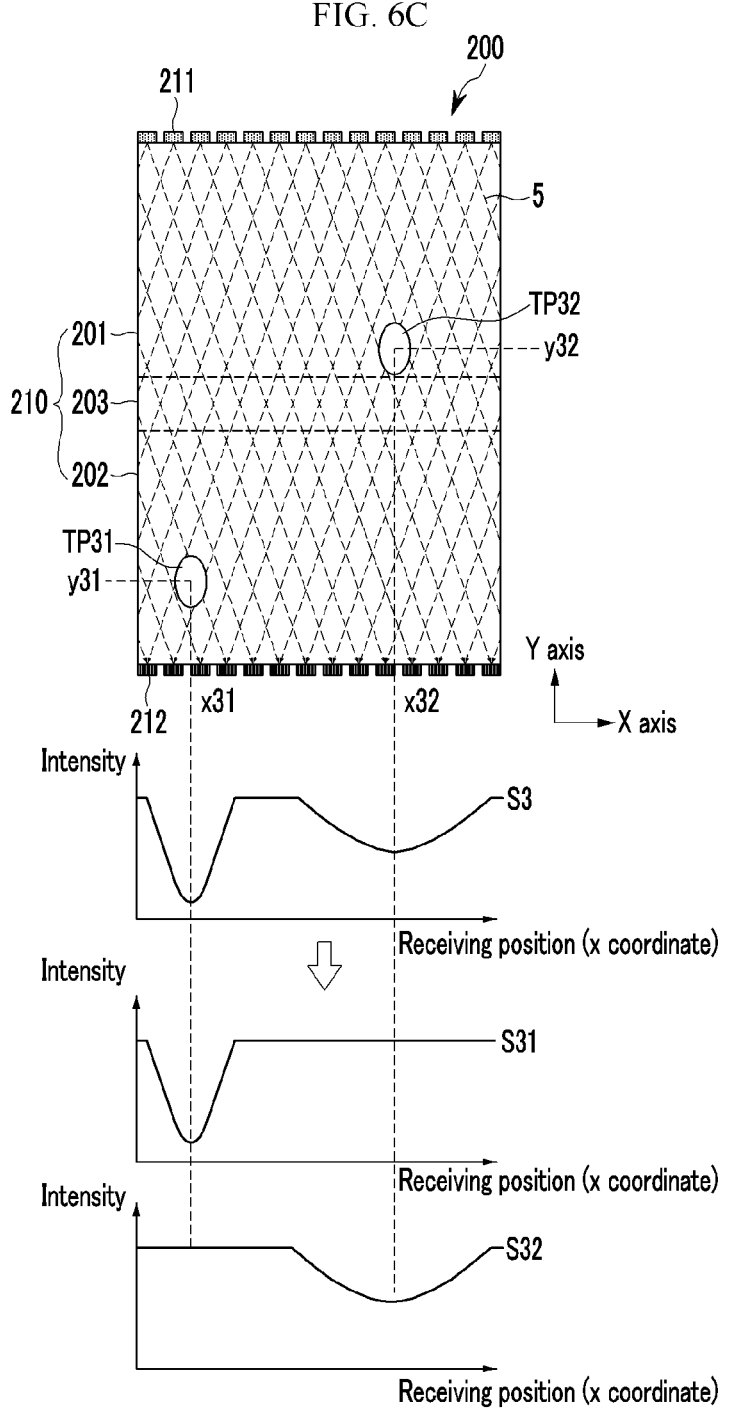

Referring to FIG. 6C, when two different points TP31 and TP32 are simultaneously touched, a signal intensity distribution S3 of ultrasonic signals detected by the ultrasonic receiving transducers 212 includes two point at which the signal intensity variation of greater than or equal to the threshold value due to the two different touch points TP31 and TP32. When the x coordinate values of the two touch points TP31 and TP32 are different from each other, the signal intensity distribution S3 of the ultrasonic signals detected by the ultrasonic receiving transducers 212 has two different signal intensity distributions S31 and S32 depending on a receiving position. The touch controller 230 discriminates between the signal intensity distributions S31 and S32 corresponding to respective touch points TP31 and TP32 depending on the receiving position, and obtains respective touch coordinate values of the touch points TP31 and TP32 based on the respective signal intensity distributions S31 and S32.

Referring to FIG. 6D, when the y coordinate values of two touch points TP41 and TP42 that are simultaneously touched are different, a signal intensity distribution S4 of the ultrasonic signals detected by the ultrasonic receiving transducers 212 has two signal intensity distributions S41 and S42 of which the signal intensity variations are different from each other. The touch controller 230 discriminates between the signal intensity distributions S41 and S42 corresponding to respective touch points TP41 and TP42 depending on the amounts of the signal intensity variations, and obtains respective touch coordinate values of the touch points TP41 and TP42 based on respective signal intensity distributions S41 and S42.

As described above, the touch controller 230 obtains the signal intensity distribution according to the receiving position (the position of each ultrasonic receiving transducer 212) based on the touch signal from the ultrasonic receiver 222, thereby obtaining the touch coordinate value.

The ultrasonic receiving transducers 212 may set an initial signal intensity of the ultrasonic signal through calibration. Further, the touch controller 230 may detect a touch coordinate value based on an amount of variation between an initial signal intensity and the respective signal intensity distributions S41 and S42. Accordingly, although the signal intensity of the ultrasonic signals received by the plurality of ultrasonic receiving transducers 212 is not uniform in a state without a touch, a touch coordinate value may be detected.

Referring back to FIG. 2, the touch controller 230 outputs a touch event including a touch coordinate (value) to the application processor 250.

When the application processor 250 receives the touch event from the touch controller 230, the application processor 250 processes the touch event. Application software operated in the application processor 250 renders image data (or image frame) for displaying on the display panel 240 according to processing of the touch event received from the touch controller 230.

The image data rendered by the application processor 250 are transmitted to the display panel 240 and displayed by the display panel 240.

The display panel 240 displays the image data rendered by the application processor 250.

The display panel 240 may be a transparent display panel. The transparent display panel maintains transparency with which an object positioned at a rear side of the display panel 240 is able to be viewed at the front of the display panel 240 while the transparent display panel does not display an image. Further, while the transparent display panel displays an image, the transparent display panel maintains a predetermined transparency.

The display panel 240 may be realized in various types such as a liquid crystal display (LCD) panel, a thin film transistor liquid crystal display (TFT-LCD) panel, a field emission display (FED) panel, an organic light emitting diode display (OLED) panel, a quantum dot display panel, and the like.

As described above, in the display device 20 according to the first exemplary embodiment of the present inventive concept, the front waveguides 201, the back waveguides 202 with the same acoustic impedance and the bridge waveguide 203 connecting the waveguides 201 and 202 are disposed to surround the front, back, and side surfaces of the display panel 240 respectively. Further, the display device 20 detects the touch signal based on the signal intensity variation of the ultrasonic signal propagated through the waveguides 201, 202, and 203. Accordingly, the display panel 240 may detect a touch input at the lateral surface as well as the front and back surfaces of the display panel 240.

As shown in FIG. 3A, in the first exemplary embodiment of the present inventive concept, the touch panel 200 includes one of the bridge waveguide 203 connecting the front waveguide 201 and the back waveguide 202, but is not limited thereto.

The touch panel 200, as shown in FIG. 7, may be configured to include two bridge waveguides 203a and 203b connecting end portions of a front waveguide 201 and a back waveguide 202. In this case, in the front and back waveguides 201 and 202, a plurality of ultrasonic transmitting and receiving transducers 211a and 212a are respectively disposed at a first end portion facing the first bridge waveguide 203a and a plurality of ultrasonic transmitting and receiving transducers 211b and 212b are respectively disposed at a second end portion facing the second bridge waveguide 203b. Accordingly, an ultrasonic signal outputted from an inter-digital transducer 211a disposed at the first end portion of the front waveguide 201 and an ultrasonic signal outputted from an inter-digital transducer 211b disposed at the second end portion of the front waveguide 201 respectively propagate in directions crossing each other to be respectively detected by the ultrasonic receiving transducer 212a disposed at the first end portion of the back waveguide 202 and the ultrasonic receiving transducer 212b disposed at the second end portion of the back waveguide 202. Accordingly, the touch controller 230 may detect both an x coordinate (value) and a y coordinate (value) of a touch point according to the method described with reference to FIG. 6A. That is, the touch controller 230 may detect both the x coordinate value and the y coordinate value of the touch point from positions of ultrasonic receiving transducers 212a and 212b at which a signal intensity variation of an ultrasonic signal above a threshold value is detected.

According to the first exemplary embodiment of the present inventive concept, the touch controller 230 may recognize a grasping position of a user's fingers from the touch coordinate values, thereby calculating a touch estimating area. Further, the touch controller 230 may reduce power for the touch process by driving some of the inter-digital transducers 211 and the ultrasonic receiving transducers 212 depending on the calculated touch estimating area.

FIG. 8 is a flowchart of a touch detecting method of the touch device according to the first exemplary embodiment of the present inventive concept.

Referring to FIG. 8, the touch device according to the first exemplary embodiment of the present inventive concept performs calibration of a receiving signal intensity of an ultrasonic signal (S800).

In the calibration step (S800), the inter-digital transducers 211 generate an ultrasonic signal in a state in which no touch occurs, and the ultrasonic receiving transducers 212 receive an ultrasonic signal propagated through the waveguide 210 of the touch device. Signal intensities of the ultrasonic signals received by respective ultrasonic receiving transducers 212 are stored as initial signal intensities for each ultrasonic receiving transducers 212, and later, the initial signal intensities are used as a reference value for detecting a signal intensity variation of the ultrasonic signal.

When touch detection is started, the inter-digital transducers 211 continuously (or periodically) generate an ultrasonic signal, respectively. Further, the ultrasonic receiving transducers 212 continuously (or periodically) receive an ultrasonic signal propagated through the waveguide 210 of the touch device (S810). The ultrasonic signal received through the ultrasonic receiving transducers 212 is converted into a touch signal representing a signal intensity distribution according to a receiving position by the ultrasonic receiver 222, and is transmitted to the touch controller 230 (S820).

The touch controller 230 analyzes the touch signal from the ultrasonic receiver 222, and determines whether a signal intensity variation of greater than or equal to a threshold value occurs in the received ultrasonic signals. If the signal intensity variation of greater than or equal to the threshold value is detected in the received ultrasonic signals, the touch controller 230 determines that a touch occurs (S830).

When it is recognized that the touch occurs, the touch controller 230 determines, from the touch signal, a receiving position (a position of the ultrasonic receiving transducer 212) at which the signal intensity variation occurs, and obtains an x coordinate value of the touch point through the detected receiving position (S840).

The touch controller 230, at step S840, may determine, as the x coordinate value of the touch point, a center position of an area in which the signal intensity variation of greater than or equal to the threshold value of the ultrasonic signal is detected in the ultrasonic receiving transducers 212.

The touch controller 230, at step S840, may determine, as the x coordinate value of the touch point, a receiving position at which signal intensity variation of the ultrasonic signal has a maximum value (or an ultrasonic receiving transducer 212 at which signal intensity variation of the received ultrasonic signal has a maximum value).

The touch controller 230, from the touch signal, determines a size of an area in which the signal intensity variation of greater than or equal to the threshold value of the ultrasonic signal is detected in the ultrasonic receiving transducers 212 (or the number of the ultrasonic transducers 212 at which the signal intensity variation of greater than or equal to the threshold value of the ultrasonic signal is detected), and a signal intensity variation amount of the ultrasonic signal. Further, the touch controller 230 obtains a y coordinate value based on the obtained size of the area in which the signal intensity variation of greater than or equal to the threshold value of the ultrasonic signal is detected, and the obtained signal intensity variation value of the ultrasonic signal (S850).

When the touch coordinate values are obtained through steps S840 to S850, the touch controller 230 generates a touch event including the touch coordinate values (S860).

A touch device and a display device including the touch device according to a second exemplary embodiment of the present inventive concept will now be described in detail with reference to FIGS. 9 to 12.

Figure 9:
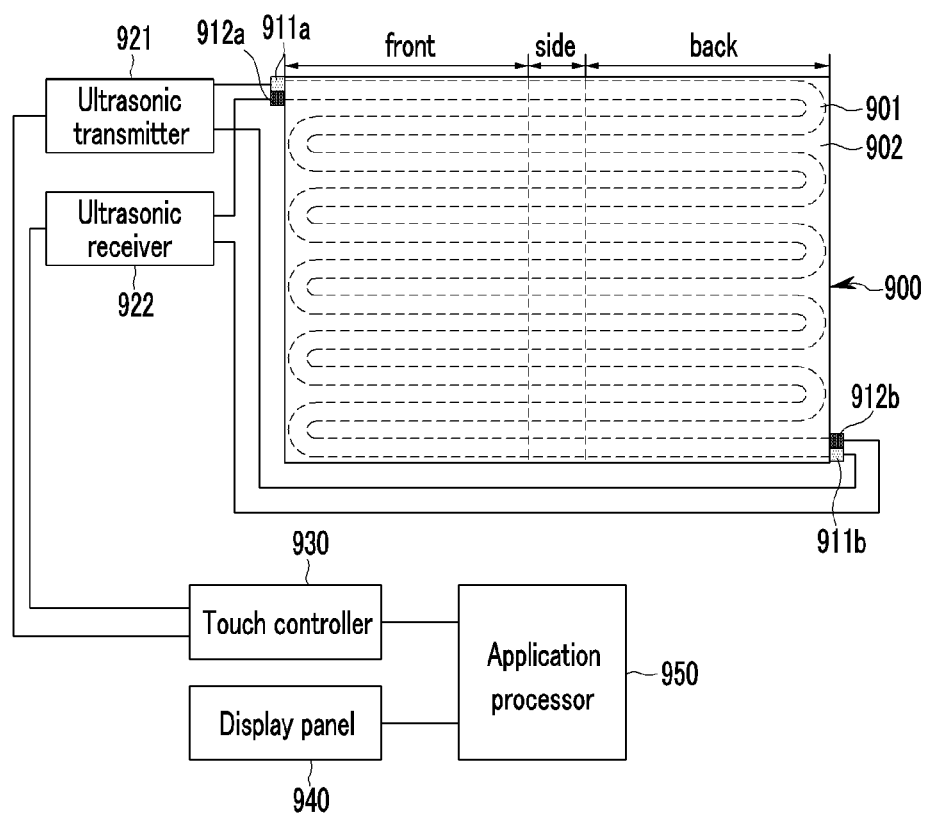
FIG. 9 is a schematic block diagram of a display device according to a second exemplary embodiment of the present inventive concept.
Figure 10A:
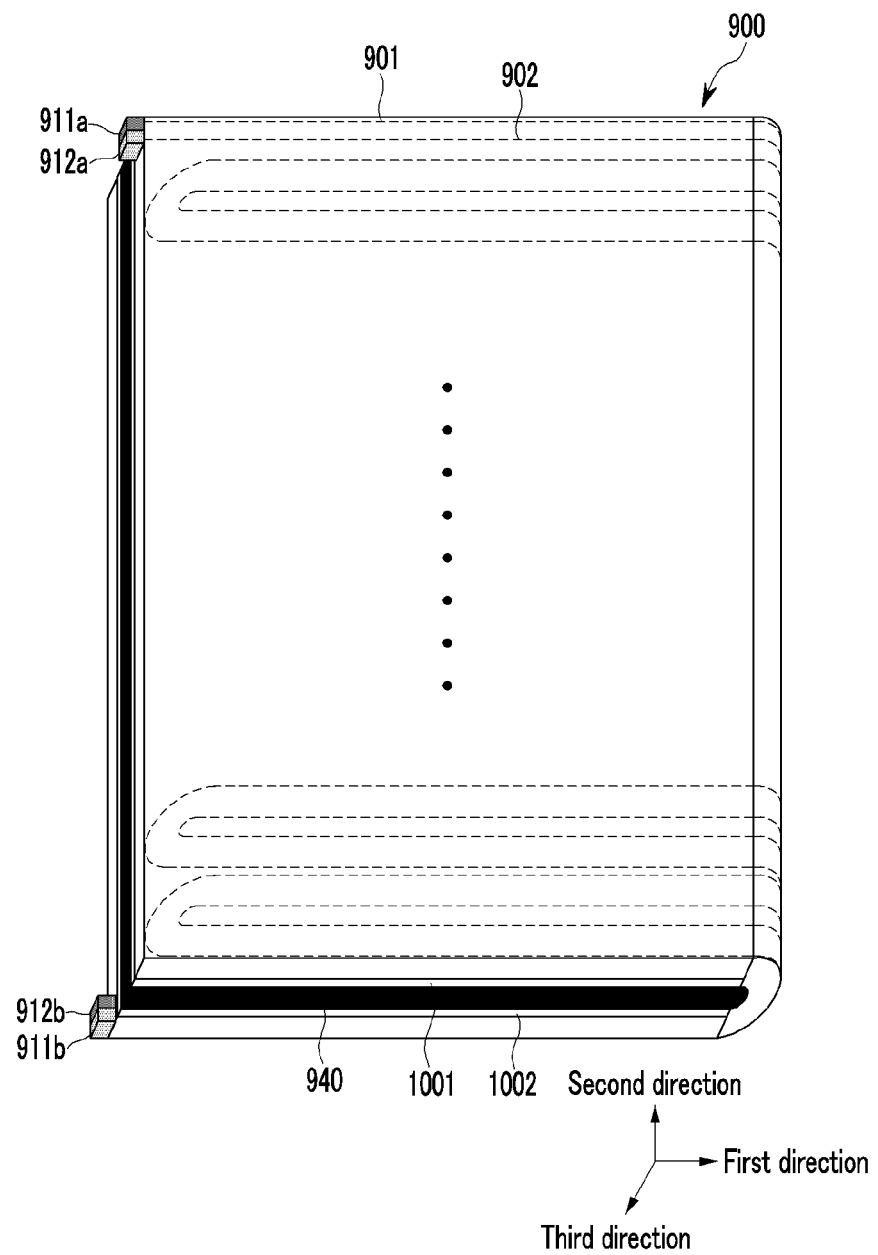
FIG. 10A is a schematic perspective view of a touch panel according to a second exemplary embodiment of the present inventive concept.
Figure 10B:
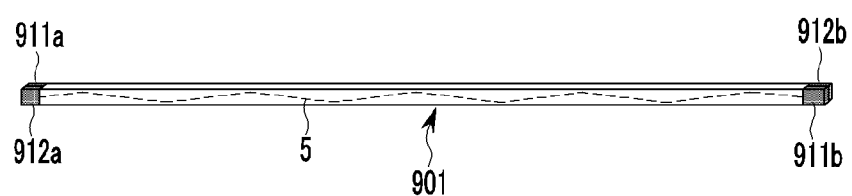
FIG. 10B is a perspective view illustrating a waveguide of the touch panel according to the second exemplary embodiment of the present inventive concept in an unfolded state.
Figure 10C:
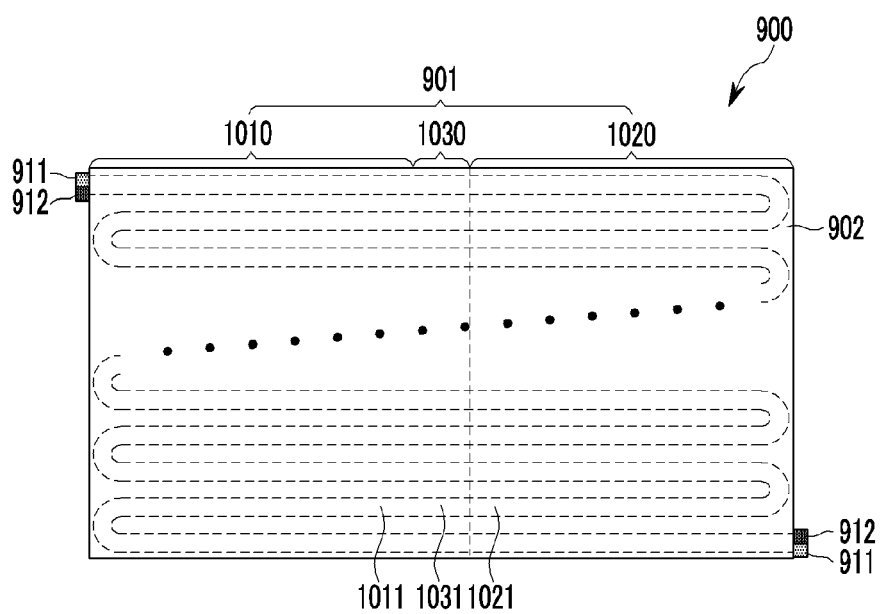
FIG. 10C is a schematic top plan view illustrating the touch panel according to the second exemplary embodiment of the present inventive concept in an unfolded state.
Figure 11B:
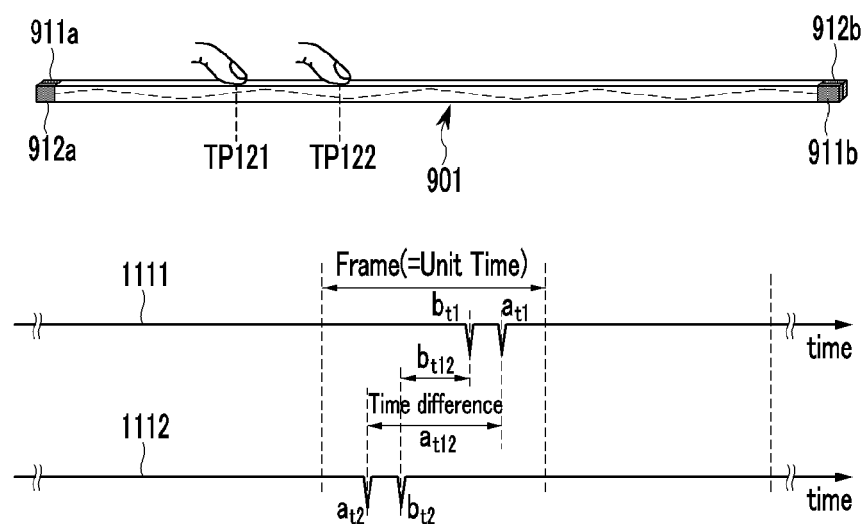
Figure 11C:
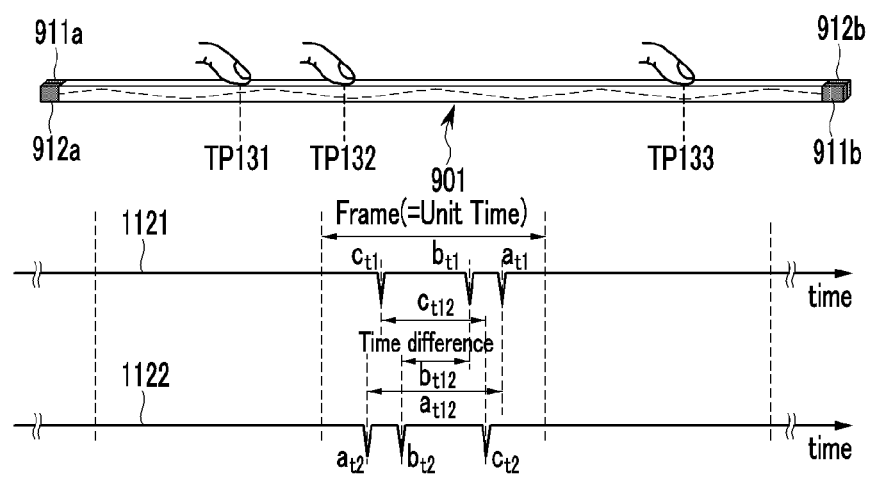
Figure 12:
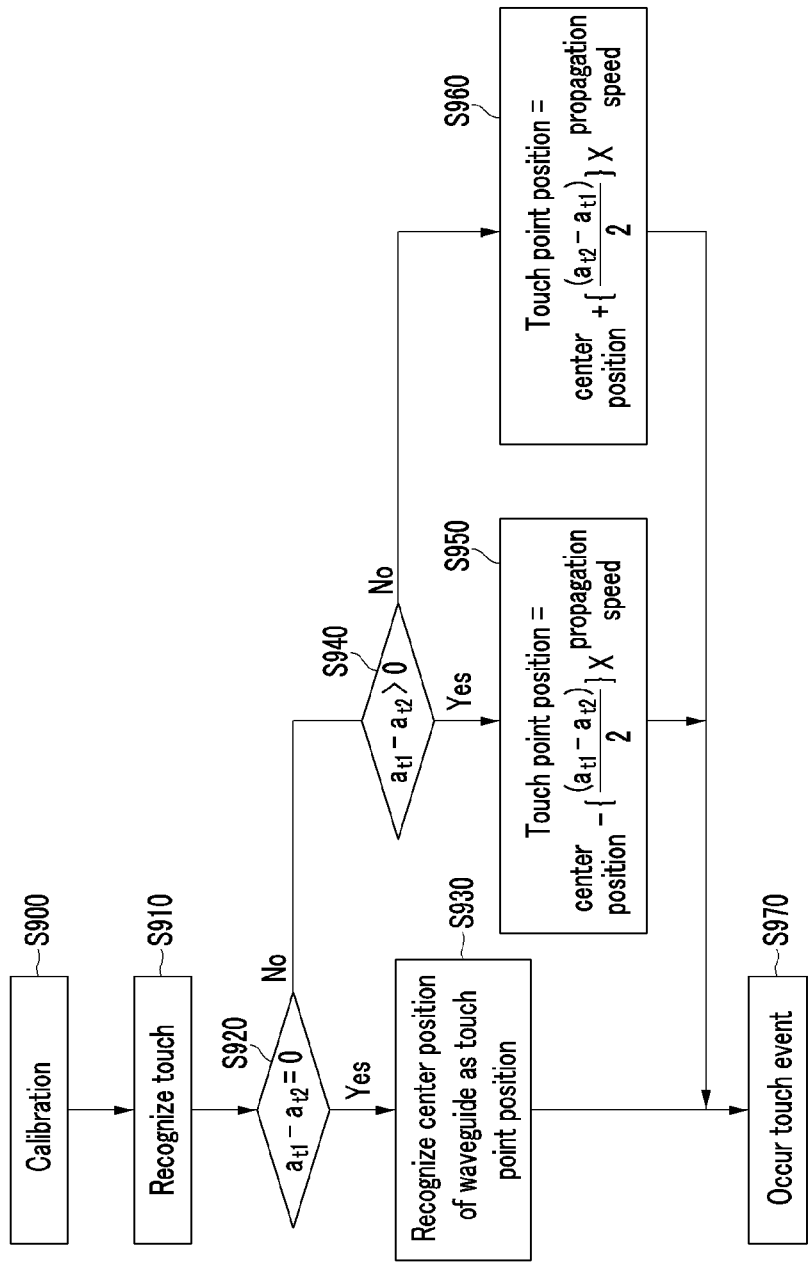
FIG. 12 is a flowchart of a touch detecting method of the touch device according to the second exemplary embodiment of the present inventive concept.

FIG. 9 is a schematic block diagram of a display device according to a second exemplary embodiment of the present inventive concept. FIG. 10A is a schematic perspective view of a touch panel according to the second exemplary embodiment of the present inventive concept. FIG. 10B is a perspective view illustrating a waveguide of the touch panel according to the second exemplary embodiment of the present inventive concept in an unfolded state. FIG. 10C is a schematic top plan view illustrating the touch panel according to the second exemplary embodiment of the present inventive concept in an unfolded state. FIGS. 11A to 11C are schematic diagrams illustrating methods of obtaining touch coordinate values by the touch device according to the second exemplary embodiment of the present inventive concept. FIG. 12 is a flowchart of a touch detecting method of the touch device according to the second exemplary embodiment of the present inventive concept.

Referring to FIG. 9, a display device 20 according to the second exemplary embodiment of the present inventive concept may include a touch device, a display panel 940, and an application processor 950. The touch device may include a waveguide 901, a filler 902, a touch panel 900 including inter-digital transducers 911a and 911b and ultrasonic receiving transducers 912a and 912b, an ultrasonic transmitter 921, an ultrasonic receiver 922, and a touch controller 930. The touch device according to the second exemplary embodiment of the present inventive concept is not limited to constituent elements shown in FIG. 9, and may include more or fewer constituent elements than the constituent elements shown in FIG. 9.

For better understanding and ease of description, although the touch panel 900 of the touch device is show in an unfolded state in FIG. 9, the touch panel 900 according to the second exemplary embodiment of the present inventive concept is provided as a foldable type to surround a front surface, a back surface, and at least one lateral surface of the display panel 940 as shown in FIG. 10A.

The waveguide 901 is a medium for an ultrasonic signal to be propagated along an outer surface of the display panel 940. In order to detect a touch input on the outer surface of the display panel 940 using energy leakage of an ultrasonic signal due to the touch input, it is required that the ultrasonic signal is overall propagated on the outer surface of the display panel 940 at which the touch input needs to be detected. Accordingly, in order to detect a touch input on a plurality of surfaces including the front, back, and at least one lateral surfaces of the display panel 940, the waveguide 901 propagating the ultrasonic signal needs to be disposed at the front, back, and at least one lateral surfaces of the display panel 940.

Referring to FIGS. 10A to 10C, the waveguide 901 according to the second exemplary embodiment of the present inventive concept is formed in a zigzag form along the front and back surfaces of the display panel 940 and one lateral surface thereof connecting the front and back surfaces to surround the front, back, and one lateral surfaces of the display panel 940. That is, the waveguide 901 is repeatedly bent and disposed to surround the front, back, and one lateral surfaces of the display panel 940.

Referring to FIG. 10C, the waveguide 901 is divided into a front surface portion 1010 disposed to cover the front surface of the display panel 940, a back surface portion 1020 disposed to cover the back surface of the display panel 940, and a connecting portion 1030 disposed to cover the one lateral surface of the display panel 940 and connecting the front surface portion 1010 and the back surface portion 1020 The front surface portion 1010 is disposed on the front surface of the display panel 940 and has a predetermined width and interval. The front surface portion 1010 includes a plurality of sub-waveguides 1011 repeatedly disposed to cover the front surface of the display panel 940. As one portion of the waveguide 901, the back surface portion 1020 is disposed on the back surface of the display panel 940 and has a predetermined width and interval. The back surface portion 1020 includes a plurality of sub-waveguides 1021 repeatedly disposed to cover the back surface of the display panel 940. As one portion of the waveguide 901, the connecting portion 1030 is disposed on the lateral surface of the display panel 940 and has a predetermined width and interval. The connecting portion 1030 includes a plurality of sub-waveguides 1031 connecting the sub-waveguides 1011 of the front surface portion 1010 and the sub-waveguides 1021 of the back surface portion 1020. The width of the wave guide in the front surface portion 1010, the back surface portion 1020 and the connecting portion 1030 may be same. The interval of the wave guide in the front surface portion 1010, the back surface portion 1020 and the connecting portion 1030 may be same.

In the present exemplary embodiment, the waveguide 901 may be formed by combining the front surface portion 1010, the back surface portion 1020, and the connecting portion 1030 that are separately formed. That is, the waveguide 901 may be formed by combining the sub-waveguides 1011, 1021, and 1031 configuring the front surface portion 1010, the back surface portion 1020, and the connecting portion 1030 that are separately formed. On the other hand, the waveguide 901 may be formed in one plate shape, and then may be bent to form the front surface portion 1010, the back surface portion 1020, and the connecting portion 1030 in a foldable type.

The waveguide 901 may be formed within 2 mm in width to ensure touch accuracy.

Fillers 902 are filled between the respective sub-waveguides 1011, 1021, and 1031 to flatten the outer surface of the touch panel 900. The filler 902 may be formed of a material of which the acoustic impedance differs from that of the waveguide 901 by more than a predetermined value so that the ultrasonic signal may be propagated within the waveguide 901 through total reflection.

To prevent gaps between the respective sub-waveguides 1011, 1021, and 1031 configuring the waveguide 901 from being viewed by a user, the interval between the respective sub-waveguides 1011, 1021, and 1031 are formed in a minimum width to the extent that total reflection of the ultrasonic signal propagated within the waveguide 901 is not disturbed. Further, the gaps between the respective sub-waveguides 1011, 1021, and 1031 may be aligned in a black matrix (PB), and an index matching material may be used as a filler of the gaps.

The touch panel 900 may include assistant layers 1001 and 1002 that are provided between the outer surfaces (at least one of the front, back, and lateral surfaces) of the waveguide 901 and the display panel 240. The assistant layers 1001 and 1002 may be formed of a material of which the acoustic impedance differs from that of the waveguide 901 by more than a predetermined value so that the ultrasonic signal may be propagated within the waveguide 901 of the touch panel 900.

A first inter-digital transducer 911a and a first ultrasonic receiving transducer 912a are combined to one end of the waveguide 901. A second inter-digital transducer 911b and a second ultrasonic receiving transducer 912b are combined to the other end of waveguide 901.

The first inter-digital transducer 911a and the second inter-digital transducer 911b respectively generate the ultrasonic signal at different end portions of the waveguide 901, and the waveguide 901 propagates the generated ultrasonic signal along the front, one lateral, and back surfaces of the display panel 940 to be transmitted to the respective ultrasonic receiving transducers 912b and 912a.

The ultrasonic signal generated by the first inter-digital transducer 911a is propagated along the waveguide 901 to be received by the second ultrasonic receiving transducer 912b. The ultrasonic signal generated at the second ultrasonic receiving transducer 912b is propagated along the waveguide 901 to be received by the first ultrasonic receiving transducer 912a.

A kind of medium forming the waveguide 901 is not limited, but a material of which acoustic impedance differs from that of external air by more than a predetermined value may be used so that loss of ultrasonic signal occurs while an ultrasonic signal is propagated may be prevented.

The waveguide 901 may be formed of a transparent material to prevent a loss of transparency of the display panel 940.

The waveguide 901 may be formed of glass, plastic, a polymer, or the like.

The first and second inter-digital transducers 911a and 911b may be actuators that convert an input electrical signal into a vibration signal to generate an ultrasonic signal. The first and second inter-digital transducers 911a and 911b may respectively include a piezoelectric substrate and an electrode formed on the piezoelectric substrate. The first and second inter-digital transducers 911a and 911b are respectively combined to different end portions of the waveguide 901, and generate the ultrasonic signal at different end portions of the waveguide 901.

Each of the first and second ultrasonic receiving transducers 912a and 912b is an actuator that receives a vibration signal which is an ultrasonic signal and converts the received vibration signal to an electrical signal. Each of the first and second ultrasonic receiving transducers 912a and 912b may include a piezoelectric substrate and an electrode formed on the piezoelectric substrate. The first and second ultrasonic receiving transducers 912a and 912b are respectively combined to different end portions of the waveguide 901, and generate the ultrasonic signal at different end portions of the waveguide 901.

Referring back to FIG. 9, the ultrasonic transmitter 921 is connected with the first and second inter-digital transducers 911a and 911b. The ultrasonic transmitter 921 supplies driving signals (driving voltages) to the first and second inter-digital transducers 911a and 911b to generate ultrasonic signals.

The ultrasonic receiver 922 is connected with the first and second ultrasonic receiving transducers 912a and 912b. The ultrasonic receiver 922 processes electrical signals outputted from the first and second ultrasonic receiving transducers 912a and 912b to generate touch signals.

A gain of an electrical signal outputted from each of the first and second ultrasonic receiving transducers 912a and 912b is determined depending on intensity of an ultrasonic signal received at each of the ultrasonic receiving transducers 912a and 912b. That is, as the intensity of the ultrasonic signal received at the ultrasonic receiving transducer 912a and 912b is greater, the gain of the electrical signal outputted from the ultrasonic receiving transducers 912a and 912b increases. Accordingly, the ultrasonic receiver 922 generates a touch signal representing intensity variation of the ultrasonic signal in the ultrasonic receiving transducers 912a and 912b according to the electrical signal outputted from the ultrasonic receiving transducers 912a and 912b.

The ultrasonic receiver 922 is connected with the touch controller 930, and outputs the touch signal to the touch controller 930.

The touch controller 930 processes the touch signal outputted from the ultrasonic receiver 922, and outputs a touch event such as a touch coordinate (value) of a touch point to the application processor 950.

The ultrasonic signal generated at the inter-digital transducers 911a and 911b is delayed while propagating through the waveguide 901, and then is transmitted to the ultrasonic receiving transducers 912b and 912a. While the ultrasonic signal is propagated through the waveguide 901, a time delay due to the energy leakage due to the touch until the ultrasonic signal is transmitted to each of the ultrasonic receiving transducers 912b and 912a varies depending on a touch position. As the touch point is closer to the ultrasonic receiving transducers 912a and 912b (or farther to the inter-digital transducers 911a and 911b), the time for the ultrasonic signal with the energy leakage due to the touch to reach the ultrasonic receiving transducer 912a and 912b is shortened.

The touch controller 930 obtains a time point at which a signal intensity variation of greater than or equal to a threshold value sufficient to detect the touch event is detected at the first and second ultrasonic receiving transducers 912a and 912b, based on the touch signal received by the ultrasonic receiver 922. Further, the touch controller 930 obtains a touch coordinate based on a time difference between the time points at which the signal intensity variation of greater than or equal to the threshold value is respectively detected at the first and second ultrasonic receiving transducers 912a and 912b.

A detecting method of a touch coordinate performed by the touch controller 930 will now be described in detail with reference to FIGS. 11A to 11C. FIGS. 11A to 11C illustrate signal intensity variation with respect to time of an ultrasonic signal received by each of the ultrasonic receiving transducers 912a and 912b according to touch occurrence.

When a touch point is a center of the waveguide 901, a relational equation between time points $a_{t1}$ and $a_{t2}$ when an ultrasonic signal of which the signal intensity decreases corresponding to the touch point is received by the first ultrasonic receiving transducer 912a and the second ultrasonic transducer 912b, respectively, is the same as in the following Equation 1.

$$a_{t1}-a_{t2}=0 \quad \text{[Equation 1]}$$

Referring to Equation 1, when the touch point is the center of the waveguide 901, the ultrasonic signal of which the signal intensity decreases corresponding to the touch point is received by the first ultrasonic receiving transducer 912a and the second ultrasonic transducer 912b at the same time point.

When the time points $a_{t1}$ and $a_{t2}$ at which the signal intensity variation of greater than or equal to the threshold value due to the touch at the first and second ultrasonic receiving transducers 912a and 912b is detected are equal, the touch controller 930 determines that the center of the waveguide 901 is touched. Further, the touch controller 930 obtains a coordinate on the display panel 940 corresponding to the center of the waveguide 901 as a touch coordinate.

When the touch point on the waveguide 901 is closer to the first inter-digital transducers 911a and the first ultrasonic receiving transducer 912a than the center of the waveguide 901, a relational equation between the time $a_{t1}$ and $a_{t2}$ at which the signal intensity variation of greater than or equal to the threshold value due to the touch at the first ultrasonic receiving transducer 912a and the second ultrasonic transducer 912b is detected is the same as in the following Equation 2.

$$a_{t1}-a_{t2}>0 \quad \text{[Equation 2]}$$

Referring to Equation 2, when the touch point on the waveguide 901 is closer to the first inter-digital transducers 911a and the first ultrasonic receiving transducer 912a than the center of the waveguide 901, the ultrasonic signal of which the signal intensity decreases while passing the touch point is first received by the first ultrasonic receiving transducer 912a rather than the second ultrasonic receiving transducer 912b.

When the ultrasonic signal is propagated within the waveguide 901 at a constant speed, a distance from the center of the waveguide 901 to the touch point is proportional to the time difference between the time points $a_{t1}$ and $a_{t2}$ at which the signal intensity variation of greater than or equal to the threshold value is detected at the first and second ultrasonic receiving transducers 912a and 912b, and a propagation speed of the ultrasonic signal within the waveguide 901.

When the ultrasonic signal of which the signal intensity decreases while passing the touch point is first transmitted to the first ultrasonic receiving transducer 912a rather than the second ultrasonic transducer 912b, the touch controller 930 determines that the touch point is closer to the first inter-digital transducer 911a and the first ultrasonic receiving transducer 912a than the center of the waveguide 901. In addition, the touch controller 930 obtains a position of the touch point on the waveguide 901 through the following Equation 3.

$$\text{Touch point position} = \text{center position} - \left[\frac{(a_{t1} - a_{t2})}{2}\right] \times \text{propagation speed} \quad \text{[Equation 3]}$$

Herein, the center position stands for the center of the waveguide 901, and the propagation speed stands for the propagation speed of the ultrasonic signal within the waveguide 901. Further, the touch point position stands for the position of the touch point within the waveguide 901.

When a touch point position is calculated through Equation 3, the touch controller 930 converts the calculated touch point position into a coordinate on the display panel 940, and obtains the converted coordinate as a touch coordinate. A specific point at the waveguide 901 is positioned at a specific point on the display panel 940. The touch controller 930 converts the touch point position calculated through Equation 3 into the coordinate on the display panel 940 based on a correspondence relationship between each point of the waveguide 901 and each point of the display panel 940.

When the touch point on the waveguide 901 is closer to the second inter-digital transducer 911b and the second ultrasonic receiving transducer 912b than the center of the waveguide 901, a relational equation between the time $a_{t1}$ and $a_{t2}$ at which the signal intensity variation of greater than or equal to the threshold value due to the touch at the first ultrasonic receiving transducer 912a and the second ultrasonic transducer 912b is detected is the same as in the following Equation 4.

$$a_{t1} - a_{t2} < 0 \quad \text{[Equation 4]}$$

Referring to Equation 4, when the touch point on the waveguide 901 is closer to the second inter-digital transducer 911b and the second ultrasonic receiving transducer 912b than the center of the waveguide 901, the ultrasonic signal of which the signal intensity decreases while passing the touch point is first received by the second ultrasonic transducer 912b rather than the first ultrasonic receiving transducer 912a.

When the ultrasonic signal of which the signal intensity decreases while passing the touch point is first transmitted to the second ultrasonic receiving transducer 912b rather than the first ultrasonic transducer 912a, the touch controller 930 determines that the touch point is closer to the second inter-digital transducer 911b and the second ultrasonic receiving transducer 912b than the center of the waveguide 901. In addition, the touch controller 930 obtains a position of the touch point on the waveguide 901 through the following Equation 5.

$$\text{Touch point position} = \text{center position} + \left[\frac{(a_{t2} - a_{t1})}{2}\right] \times \text{propagation speed} \quad \text{[Equation 5]}$$

When a touch point position is calculated through Equation 5, the touch controller 930 converts the calculated touch point position into a coordinate on the display panel 940, and obtains the converted coordinate as a touch coordinate. A specific point at the waveguide 901 corresponds to a specific point on the display panel 940. The touch controller 930 converts the touch point position calculated through Equation 5 into the coordinate on the display panel 940 based on a correspondence relationship between each point of the waveguide 901 and each point of the display panel 940.

FIG. 11A illustrates respective signal intensity variations according to time of ultrasonic signals 1101 and 1102 respectively received to a first ultrasonic receiving transducer 912a and a second ultrasonic transducer 912b when one point TP111 of the waveguide 901 is touched.

Referring to FIG. 11A, while an ultrasonic signal transmitted from the first inter-digital transducer 911a is propagated along the waveguide 901 and is transmitted to the second ultrasonic receiving transducer 912b, energy of the ultrasonic signal is lost when passing the touch point TP111. Further, while an ultrasonic signal transmitted from the second inter-digital transducer 911b is propagated along the waveguide 901 and is transmitted to the first ultrasonic receiving transducer 912a, energy of the ultrasonic signal is lost when passing the touch point TP111.

As shown in FIG. 11A, when the point TP111 that is closer to the first inter-digital transducer 911a than a center of the waveguide 901 is touched, the ultrasonic signal of which the energy is lost by the touch point TP111 is first transmitted to the first ultrasonic receiving transducer 912a rather than the second ultrasonic receiving transducer 912b.

In this case, the touch controller 930 may obtain a position of the touch point TP111 through Equation 3 described above.

FIG. 11B illustrates respective signal intensity variations according to time of ultrasonic signals 1111 and 1112 respectively received by the first ultrasonic receiving transducer 912a and the second ultrasonic transducer 912b when two points on the waveguide 901 are multi-touched.

Referring to FIG. 11B, while an ultrasonic signal transmitted from the first inter-digital transducer 911a is propagated along the waveguide 901 and is transmitted to the second ultrasonic receiving transducer 912b, energy of the ultrasonic signal is lost while passing two touch points TP121 and TP122. Further, while an ultrasonic signal transmitted from the second inter-digital transducer 911b is propagated along the waveguide 901 and is transmitted to the first ultrasonic receiving transducer 912a, energy of the ultrasonic signal is lost while passing the two touch points TP121 and TP122. Accordingly, the signal intensity variation of greater than or equal to the threshold value due to the two touch points TP121 and TP122 is detected twice with a time difference at the first and second ultrasonic receiving transducers 912a and 912b.

FIG. 11C illustrates respective signal intensity variations according to time of ultrasonic signals 1121 and 1122 respectively received by the first ultrasonic receiving transducer 912a and the second ultrasonic transducer 912b when three points on the waveguide 901 are multi-touched.

Referring to FIG. 11C, while an ultrasonic signal transmitted from the first inter-digital transducer 911a is propagated along the waveguide 901 and is transmitted to the second ultrasonic receiving transducer 912b, energy of the ultrasonic signal is lost while passing three touch points TP131, TP132, and TP133. Further, while an ultrasonic signal transmitted from the second inter-digital transducer 911b is propagated along the waveguide 901 and is transmitted to the first ultrasonic receiving transducer 912a, energy of the ultrasonic signal is lost while passing the three touch points TP131, TP132, and TP133. Accordingly, the signal intensity variation of greater than or equal to the threshold value due to the three touch points TP131, TP132, and TP133 is detected three times with a time difference at the first and second ultrasonic receiving transducers 912a and 912b.

As shown in FIGS. 11B and 11C, when a plurality of points of the waveguide 901 are simultaneously touched, signal intensity variations of greater than or equal to a threshold value are detected corresponding to the number of touch points for a predetermined time (e.g., at least one frame) at the ultrasonic receiving transducers 912a and 912b.

The touch controller 930 obtains the number of detected signal intensity variations of greater than or equal to the threshold value for the predetermined time based on the touch signal at the first and second ultrasonic receiving transducers 912a and 912b, and obtains the number of touch points based on the number of detected signal intensity variations. Further, the touch controller 930 obtains a touch order of the respective touch points from time points at which the signal intensity variations are detected.

In case of a plurality of touch points, the touch controller 930 separately obtains time differences ($a_{t12}$, $b_{t12}$, and $c_{t12}$) between time points ($a_{t1}$, $b_{t1}$, $c_{t1}$, $a_{t2}$, $b_{t2}$, and $c_{t2}$) at which the signal intensity variations of greater than or equal to the threshold value are detected corresponding to respective touch points based on the touch signals at the first and second ultrasonic receiving transducers 912a and 912b.

Further, the touch controller 930 separately calculates positions of the respective touch points by assigning the obtained time differences to Equations 3 and 5.

While an ultrasonic signal generated at each of the inter-digital transducers 911a and 911b is propagated even in a state without a touch, since energy thereof is lost, a predetermined signal intensity variation (decrease) occurs. Since energy loss of the ultrasonic signal by the waveguide itself 901 may be combined with energy loss by the touch, a false recognition of a touch may occur.

The touch controller 930 may obtain an energy loss amount of the ultrasonic signal by the waveguide itself 901, that is, a signal intensity variation amount through calibration of the touch device. In addition, by compensating a signal intensity variation amount according to a touch position with the energy loss amount of the ultrasonic signal by the waveguide itself 901 obtained in the calibration, while the touch position is calculated, the touch point calculating error due to combining of the signal intensity variation by the waveguide itself 901 and the signal intensity variation by the touch point may be prevented.

Referring back to FIG. 9, the touch controller 930 outputs a touch event including a touch coordinate to the application processor 950.

When the application processor 950 receives the touch event from the touch controller 930, the application processor 950 processes the touch event. Application software operated in the application processor 950 renders image data (or image frame) for displaying on the display panel 940 according to processing of the touch event received from the touch controller 930.

The image data rendered by the application processor 950 are transmitted to the display panel 940 and displayed by the display panel 940.

The display panel 940 displays the image data rendered by the application processor 950.

The display panel 940 may be a transparent display panel. The transparent display panel maintains transparency with which an object positioned at a rear side of the display panel 940 is able to be viewed at the front of the display panel 940 while the transparent display panel does not display an image. Further, while the transparent display panel displays an image, the transparent display panel maintains predetermined transparency.

The display panel 940 may be realized as various types such as a liquid crystal display (LCD) panel, a thin film transistor liquid crystal display (TFT-LCD) panel, a field emission display (FED) panel, an organic light emitting diode display (OLED) panel, a quantum dot display panel, and the like.

The aforementioned display device 20 is disposed for the waveguide 901 to surround the front, back, and one lateral surface of the display panel 940, and the touch signal is detected based on the signal intensity variation of the ultrasonic signal propagated through the waveguide 901. Accordingly, it is possible to detect a touch input on the lateral surface of the display panel 940 as well as on the front and back surfaces of the display panel 940.

FIG. 12 is a flowchart of a touch detecting method of the touch device according to the second exemplary embodiment of the present inventive concept.

Referring to FIG. 12, the touch device according to the second exemplary embodiment of the present inventive concept performs calibration (S900).

In the calibration step (S900), the respective inter-digital transducers 911a and 911b generate an ultrasonic signal in a state in which no touch occurs. Further, the respective ultrasonic receiving transducers 912a and 912b receive an ultrasonic signal propagated through the waveguide 901 of the touch device. A difference between intensity of a transmitting ultrasonic signal in the inter-digital transducers 911a and 911b and intensity of an receiving ultrasonic signal in the ultrasonic receiving transducers 912a and 912b corresponds to a signal intensity variation (signal intensity decrease) by the waveguide 901. The touch controller 930 obtains the signal intensity variation by the waveguide 901 based on the difference between intensity of the transmitting ultrasonic signal in the inter-digital transducers 911a and 911b and the intensity of the receiving ultrasonic signal in the ultrasonic receiving transducers 912a and 912b. The signal intensity variation by the waveguide 901 may be used to compensate an ultrasonic signal received by the ultrasonic receiving transducers 912a and 912b.

The touch controller 930 analyzes a touch signal transmitted from the ultrasonic receiver 922, and at which a signal intensity variation of greater than or equal to a threshold value from an ultrasonic signal received by the respective ultrasonic receiving transducers 912a and 912b is detected, the touch controller 930 recognizes that a touch occurs (S910).

When touch detection is started, the respective inter-digital transducers 911a and 911b continuously (or periodically) generate an ultrasonic signal. Further, the respective ultrasonic receiving transducers 912a and 912b continuously (or periodically) receive an ultrasonic signal propagated through the waveguide 901 of the touch device. The ultrasonic signal received through the respective ultrasonic receiving transducers 912 is converted into a touch signal representing a signal intensity variation according time in the respective ultrasonic receiving transducers 912a and 912b by the ultrasonic receiver 922, and is transmitted to the touch controller 930.

When a touch is recognized, the touch controller 930 obtains, through the touch signal, time points $a_{t1}$ and $a_{t2}$ at which a signal intensity variation of greater than or equal to a threshold value is detected in an ultrasonic signal received by the first and second ultrasonic receiving transducers 912a and 912b.

When the time points $a_{t1}$ and $a_{t2}$ at which the signal intensity variation of greater than or equal to the threshold value is detected in the ultrasonic signal received by the first and second ultrasonic receiving transducers 912a and 912b are equal (S920), the touch controller 930 determines that a center of the waveguide 901 is touched. Accordingly, the center position of the waveguide 901 is recognized as a touch point (S930).

When the time point $a_{t1}$ at which the signal intensity variation of greater than or equal to the threshold value is detected in the first ultrasonic receiving transducer 912a is greater than the time point $a_{t2}$ at which the signal intensity variation of greater than or equal to the threshold value is detected in the second ultrasonic receiving transducer 912b, that is, $(a_{t1}-a_{t2}>0)$ (S940), the touch controller 930 calculates a position of the touch point through Equation 3 described above (S950).

On the contrary, when the time point $a_{t1}$ at which the signal intensity variation of greater than or equal to the threshold value is detected in the first ultrasonic receiving transducer 912a is smaller than the time point $a_{t2}$ at which the signal intensity variation of greater than or equal to the threshold value is detected in the second ultrasonic receiving transducer 912b, that is, $(a_{t1}-a_{t2}<0)$ (S940), the touch controller 930 calculates a position of the touch point through Equation 5 described above (S960).

When the touch controller 930 recognizes that a plurality of points are touched by multiple touches at step S910, steps S920 to S960 are performed with respect to the respective touch points to obtain a position of the respective touch points.

When the touch controller 930 obtains the positions of the respective touch points by performing steps S920 to S960, the touch controller 930 generates touch events including the obtained positions of the respective touch points (S970).

According to the aforementioned exemplary embodiments of the present inventive concept, in the touch device, the waveguide is disposed to cover the front, back, and at least one lateral surface of the display panel, and touch coordinates of the touch points in the front, back, and at least one lateral surface of the display panel may be obtained based on the signal intensity variation of the ultrasonic signal propagated through the waveguide display panel.

A method for providing a user interface (UI) to a display device provided with a touch device that is designed to enable a multiple surface touch according to the exemplary embodiments of the present inventive concept will now be described.

FIGS. 13 to 18 illustrate methods for providing user interfaces to the display devices according to the exemplary embodiments of the present inventive concept.

Figure 13:
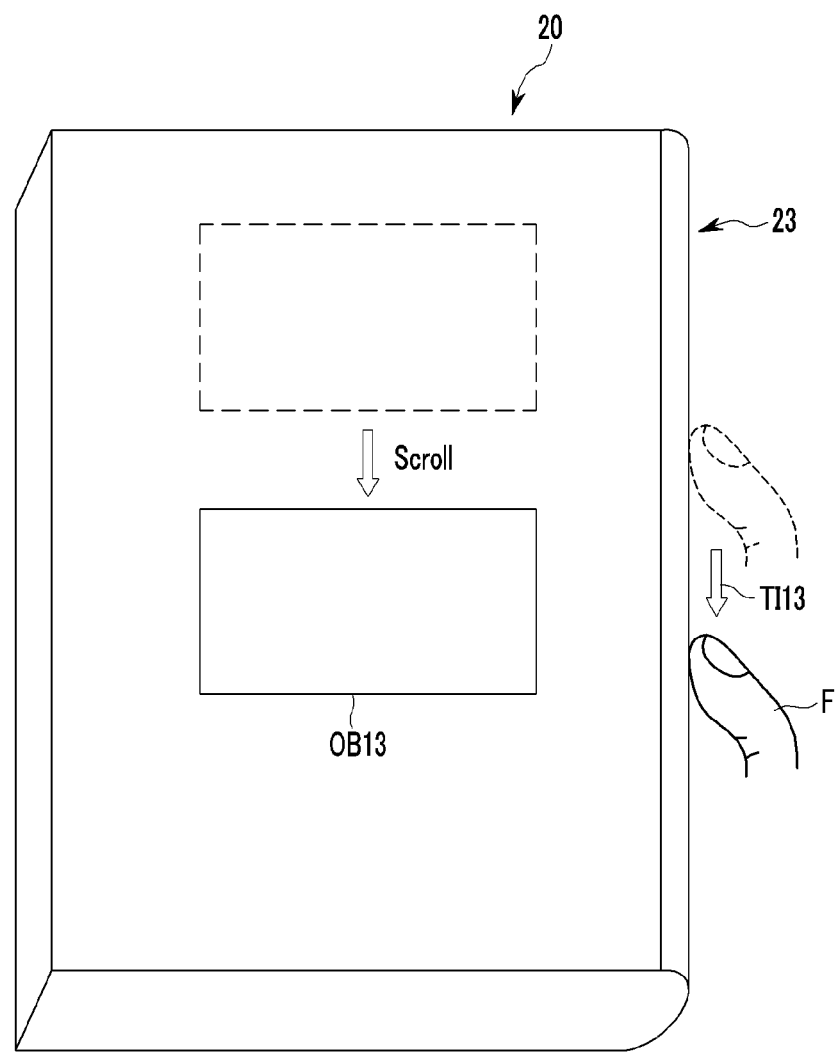
FIG. 13 illustrates an example of scrolling a display surface (or a screen) by a lateral touch input in the display device according to the exemplary embodiments of the present inventive concept.

FIG. 13 illustrates an example of scrolling a display surface through a lateral touch input in the display device according to the exemplary embodiments of the present inventive concept.

When one lateral surface covered by the touch panel (see reference numeral 200 of FIG. 2 and reference numeral 900 of FIG. 9) of the display device 20 is touched and dragged by a user's finger, the display device 20 according to the exemplary embodiments of the present inventive concept scrolls a display surface of the display device 20 in a direction corresponding to the dragging direction.

Referring to FIG. 13, as a lateral surface 23 covered by the touch panels 200 and 900 is dragged (TI13) by the user's finger F, the display device 20 scrolls an object OB13 that is being displayed on the display surface down and displays the down-scrolled object down.

When the one lateral surface covering the touch panels 200 and 900 of the display device 20 is touched and dragged by the user's finger F, the display device 20 may update and display information (or an object) that is being displayed on the display surface in a frame unit or an object unit depending on the dragging direction. For example, when an object being displayed on the display surface is a photograph, as the lateral surface 23 covered by the touch panels 200 and 900 is dragged (TI13) by the user's finger F, the display device 20 may display a next photograph or a previous photograph on the display surface corresponding to the dragging direction.

As described above, the display device 20 according to the exemplary embodiments of the present inventive concept may drag a lateral surface, and may scroll or update information (or an object) that is being displayed on the display surface depending on the dragging of the lateral surface. Accordingly, a user may input a touch gesture for scrolling or updating information (or an object) that is presently displayed on the display without covering the information (or object) presently displayed on the display with a hand.

Figure 14:
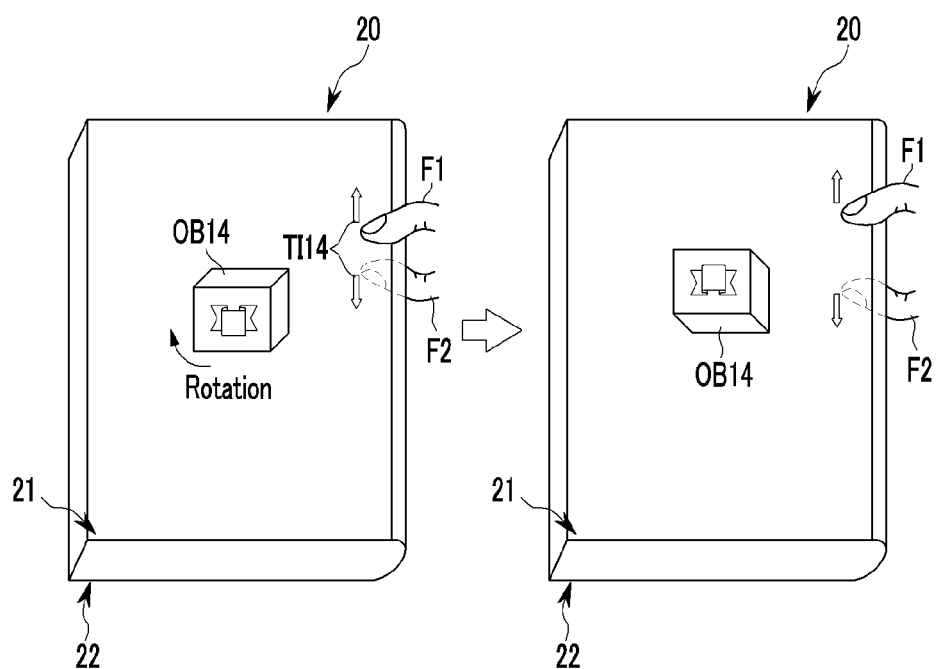
Figure 15B:
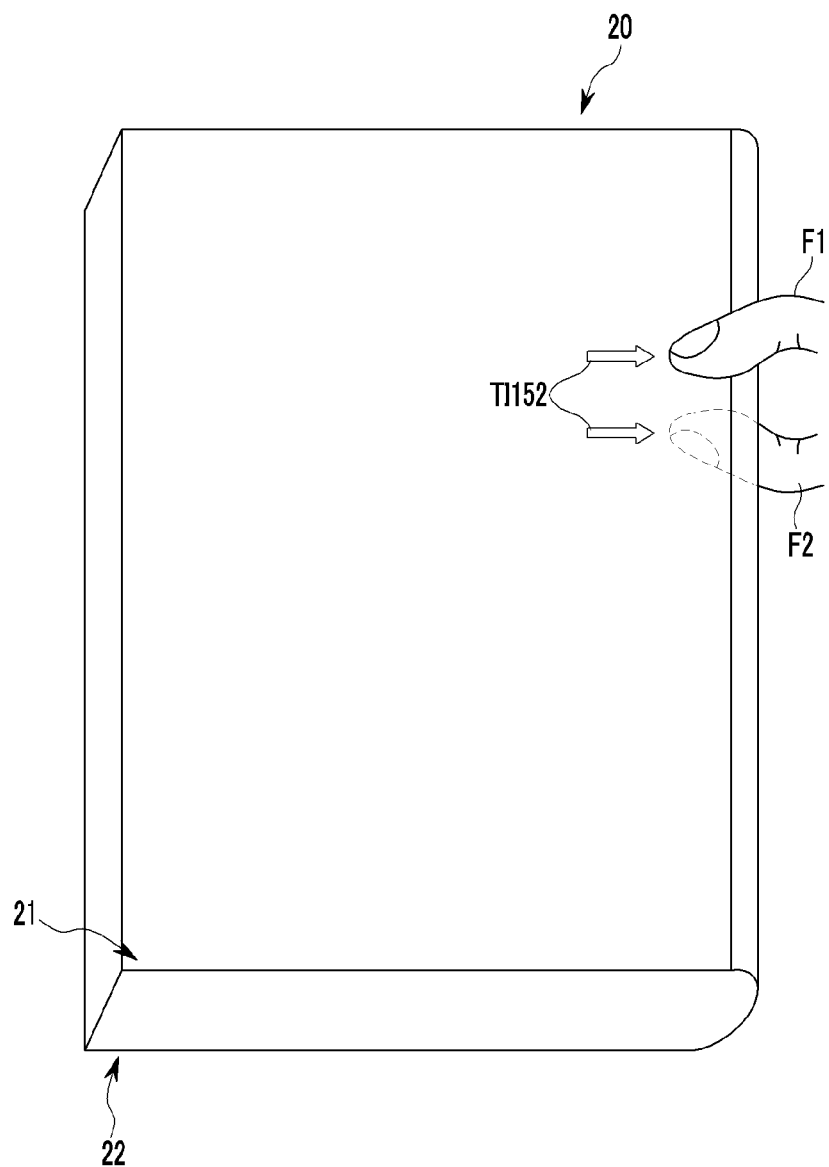

FIGS. 14 to 15B illustrate examples of providing a user interface for touch inputs on both surfaces in the display device according to the exemplary embodiments of the present inventive concept.

The display device 20 according to the exemplary embodiments of the present inventive concept, since the front and back surfaces of the display device 20 are covered by the touch panels 200 and 900, may recognize a user's multiple touch inputs on the front and back surfaces of the display device 20.

Referring to FIG. 14, the display device 20 receives touch inputs TI14 dragged in opposite directions to each other in a multiple touch state in which the front surface 21 and the back surface 22 are simultaneously touched by two fingers F1 and F2. That is, the display device 20 receives the touch input TI14 for which one F1 of the two fingers that touch the front surface 21 and the back surface 22 is dragged in a upper direction (or a lower direction) and the other F2 is dragged in the lower direction (or the upper direction). Accordingly, the display device 20 may rotate and display an object OB14 presently displayed on the display surface in a corresponding direction. As described above, the display device 20 according to the exemplary embodiments of the present inventive concept may provide the user with an intuitive user interface by rotating the object presently displayed on the display surface by the touch gesture (drag) like holding and rotating an actual object in the state in which the both surfaces (the front surface and the back surface) are multi-touched.

Referring to FIG. 15A, the display device 20 receives touch inputs TI151 in which two fingers F1 and F2 are dragged in a specific direction (e.g., an inner direction of the display surface or a left direction) in a multiple touch state in which the front surface 21 and the back surface 22 are simultaneously touched by the two fingers F1 and F2. Accordingly, the display device 20 may transmit an image being presently displayed on the display surface to an external device (e.g., a printer) presently connected to the display device 20.

Referring to FIG. 15B, the display device 20 receives touch inputs TI152 in which two fingers F1 and F2 are dragged in a specific direction (e.g., an outer direction of the display surface or a right direction) in a multiple touch state in which the front surface 21 and the back surface 22 are simultaneously touched by the two fingers F1 and F2, and then scans and store an image being presently displayed on the display surface.

FIGS. 16A to 18 illustrate examples of providing a user interface for a touch input on a back surface in the display device according to the exemplary embodiments of the present inventive concept.

Figure 16A:
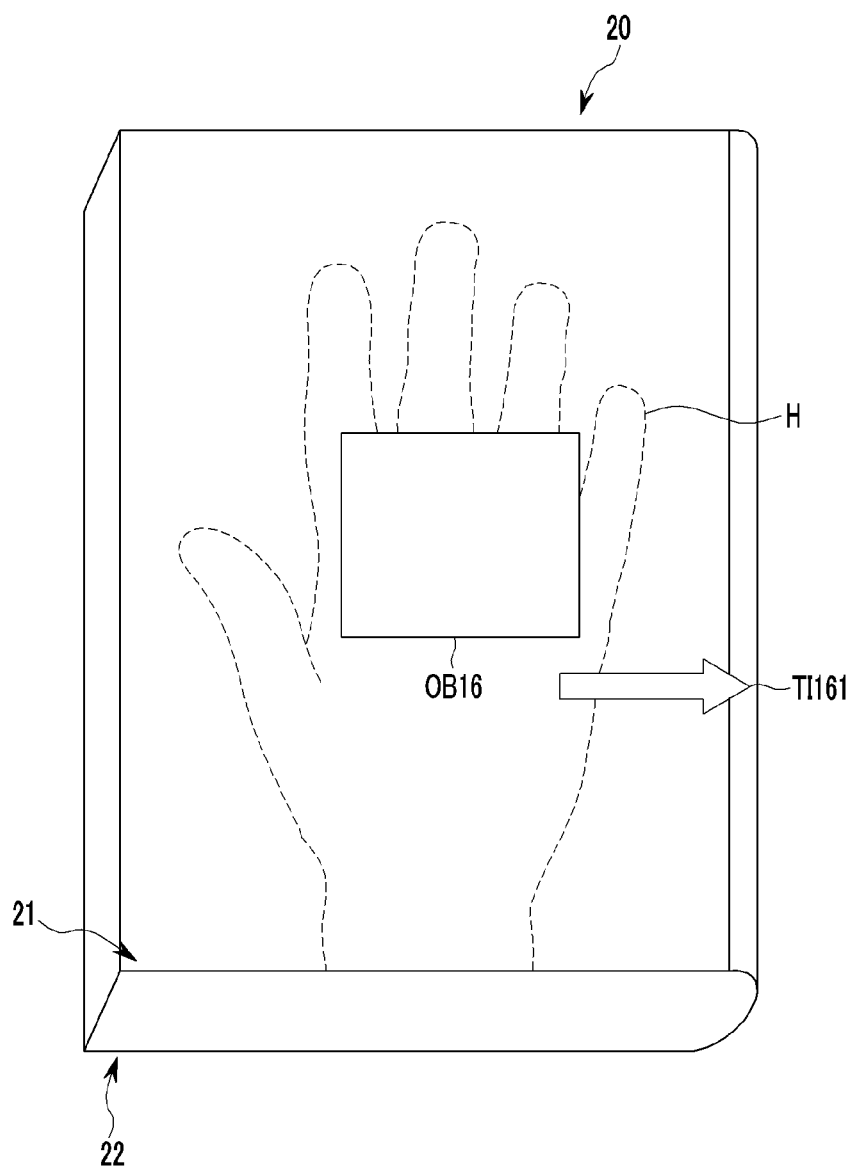
FIGS. 16A, 16B, 17 and 18 illustrate examples of providing a user interface for a touch input on a back surface in the display device according to the exemplary embodiments of the present inventive concept.

Referring to FIG. 16A, the display device 20 receives a touch input TI161 in which a user's hand H is dragged in a specific direction (e.g., a right direction) in a state that the user's hand H touches over a predetermined area of the back surface. Accordingly, the display device 20 may copy an object OB16 being presently displayed on the display surface in a clipboard.

Figure 16B:
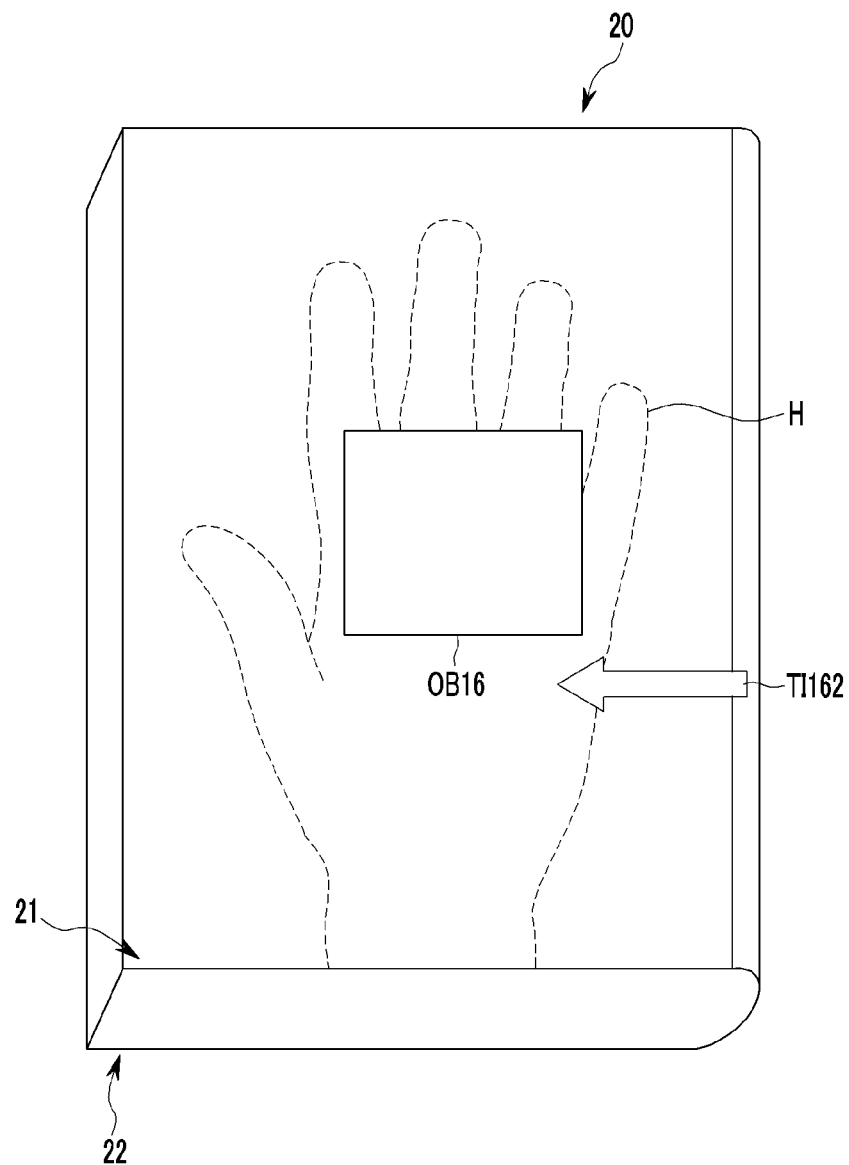

Referring to FIG. 16B, the display device 20 receives a touch input TI162 that a user's hand H is dragged in a specific direction (e.g., a left direction) in a state that the user's hand H touches over a predetermined area of the back surface. Accordingly, the display device 20 may paste the object OB16 copied in the clipboard on the display surface.

Figure 17:
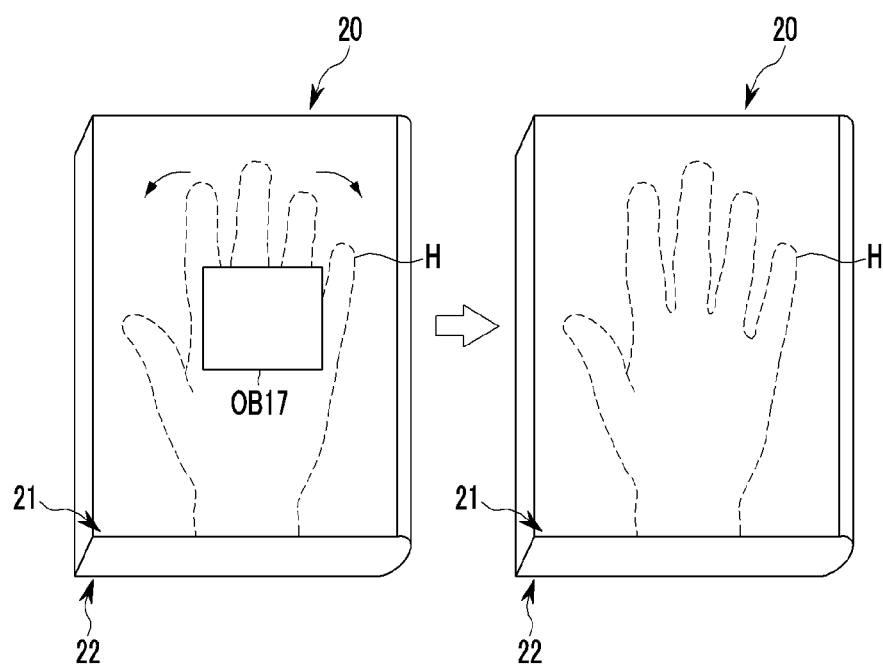

Referring to FIG. 17, the display device 20 may execute an erase operation by a user's hand H or finger being dragged and rubbing the back surface 22 more than twice in a state that the user's hand H or finger touches over a predetermined area of the back surface 22. That is, as the back surface 22 of the display device 20 is dragged in a zigzag direction in a state that the user's hand H or finger touches over a predetermined area of the back surface 22 of the display device 20, an object OB17 being presently displayed on the display surface may be erased from the display surface, or some of information (or objects) displayed on the display surface, which corresponds to a touch trace, may be removed from the display surface.

Figure 18:
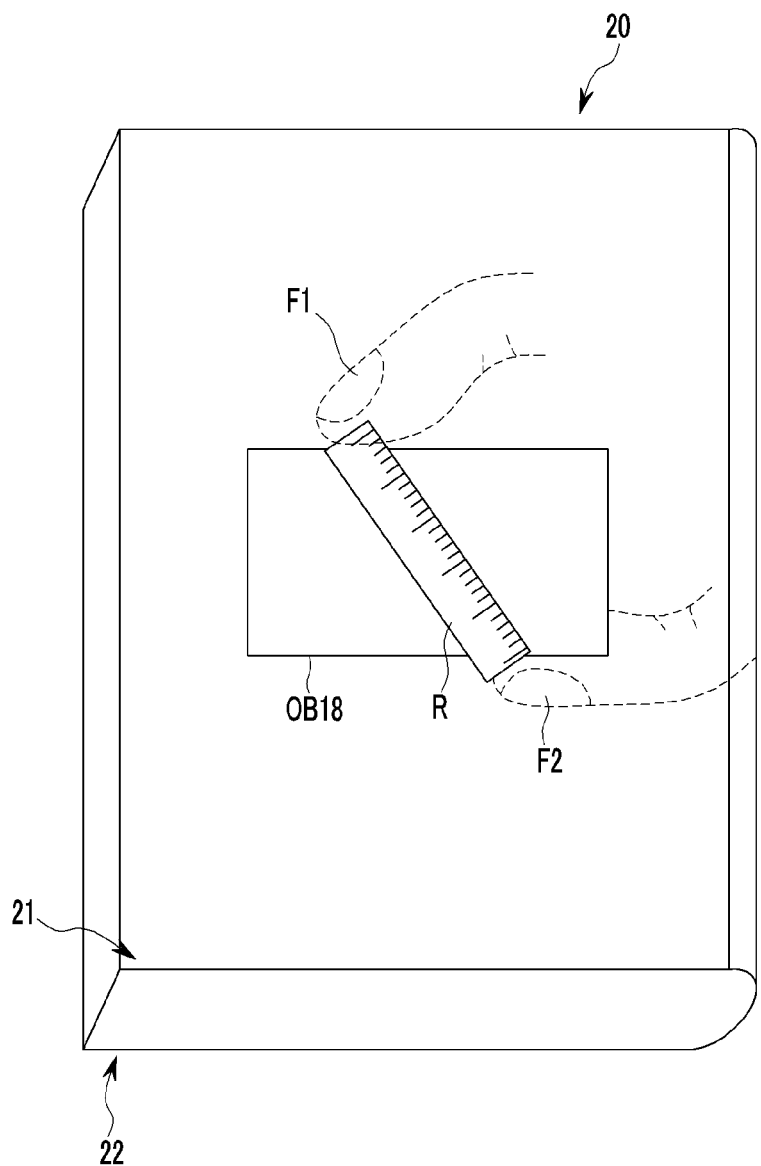

Referring to FIG. 18, as two fixed points on the back surface 22 are touched by a user's fingers F1 and F2 for more than a predetermined period of time, the display device 20 may execute a ruler operation. Accordingly, a ruler for measuring length of an object OB18 is displayed between the two touch points.

As described above, the display device according to the exemplary embodiments of the present inventive concept may provide various and intuitive user interfaces by supporting touch inputs on the front, back, and at least one lateral surface of the display device.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A touch device comprising:
a first substrate;
a second substrate facing the first substrate, and disposed to be spaced apart from the first substrate;
a third substrate connecting first end portions of the first and second substrates to each other, and propagating an ultrasonic signal propagated along the first substrate to the second substrate;
a plurality of first ultrasonic transducers connected to a second end portion of the first substrate, and propagating an ultrasonic signal to the first substrate; and
a plurality of second ultrasonic transducers connected to a second end portion of the second substrate, and receiving an ultrasonic signal propagated along the second substrate,
wherein a touch point is detected based on signal intensity variations of ultrasonic signals received by the second ultrasonic transducers,
wherein the first, second, and third substrates are disposed to cover a front surface, a back surface, and one lateral surface of a display panel,
wherein a first assistant layer with different acoustic impedance from that of the first substrate is provided between the first substrate and the display panel, and
wherein a second assistant layer with different acoustic impedance from that of the second substrate is provided between the second substrate and the display panel.

2. The touch device of claim 1, wherein
the first, second, and third substrates are waveguides guiding an ultrasonic signal generated by the first ultrasonic transducer, and have the same acoustic impedance.

3. The touch device of claim 1, wherein
when one of the first, second, and third substrates is touched, an intensity variation of greater than or equal to a threshold value is detected at least one of the second ultrasonic transducers.

4. The touch device of claim 3, wherein
a touch coordinate of the touch point is calculated based on a position and the number of the at least one second ultrasonic transducers at which the intensity variation of greater than or equal to the threshold value is detected and a signal intensity variation in the at least one second ultrasonic transducer.

5. The touch device of claim 1, further comprising
a guide bar disposed between the first ultrasonic transducers in the second end portion of the first substrate, and propagating an ultrasonic signal generated by the first ultrasonic transducers to an overall area of the first substrate.

6. The touch device of claim 5, further comprising
at least one convex lens disposed between the guide bar and the second end portion of the first substrate, and focusing the ultrasonic signal generated by the first ultrasonic transducers in a thickness direction of the first substrate.

7. The touch device of claim 5, wherein
at least one convex portion with a convex lens shape focusing the ultrasonic signal generated by the first ultrasonic transducer in the thickness direction of the first substrate is formed at one surface of the guide bar contacting the second end portion of the first substrate.

8. The touch device of claim 1, further comprising
a fourth substrate connecting third end portions of the first substrate and the second substrate to each other, propagating the ultrasonic signal propagated along the first substrate to the second substrate;
a plurality of third ultrasonic transducers combined with fourth end portion of the first substrate, propagating an ultrasonic signal to the first substrate; and
a plurality of fourth ultrasonic transducers combined with fourth end portion of the second substrate, and receiving the ultrasonic signal propagated along the second substrate.

9. The touch device of claim 8, wherein
a first coordinate of the touch point is obtained based on a signal intensity variation of the ultrasonic signal received by the second ultrasonic transducers, and
a second coordinate of the touch point is obtained based on a signal intensity variation of the ultrasonic signal received by the fourth ultrasonic transducers.

10. The touch device of claim 9, wherein
the first coordinate is obtained from a position of the at least one second ultrasonic transducer at which the intensity variation of greater than or equal to the threshold value is detected, and
the second coordinate is obtained from a position of the at least one fourth ultrasonic transducer at which the intensity variation of greater than or equal to the threshold value is detected.

11. The touch device of claim 1, wherein
the first and second substrates are a substrate, a cover window, or a cover lens of the display panel.

12. The touch device of claim 1, wherein
the first, second, and third substrates are integrally formed, and bent to surround the front surface, the back surface and at least one side surface of a display panel.

13. A display device, comprising:
a touch device including:
a first substrate,
a second substrate facing the first substrate, and disposed to be spaced apart from the first substrate,
a third substrate connecting first end portions of the first and second substrates to each other, and propagating an ultrasonic signal propagated along the first substrate to the second substrate,
a plurality of first ultrasonic transducers connected to a second end portion of the first substrate, and propagating an ultrasonic signal to the first substrate, and a plurality of second ultrasonic transducers connected to a second end portion of the second substrate, and receiving an ultrasonic signal propagated along the second substrate, wherein a touch point is detected based on signal intensity variations of ultrasonic signals received by the second ultrasonic transducers; and a display panel, wherein a front surface, a back surface, and one lateral surface of the display panel are covered by the first, second, and third substrates of the touch device, wherein a first assistant layer with different acoustic impedance from that of the first substrate is provided between the first substrate and the display panel, and wherein a second assistant layer with different acoustic impedance from that of the second substrate is provided between the second substrate and the display panel.

14. The display device of claim 13, wherein when the third substrate of the touch device is touched and dragged, an object being displayed on the display panel is scrolled.

15. The display device of claim 13, wherein when the first substrate and the second substrate of the touch device are simultaneously touched and are dragged in different directions from each other, an object being displayed on the display panel is rotated.

16. The display device of claim 13, wherein when the first substrate and the second substrate of the touch device are simultaneously touched and are dragged in a specific direction, an image being displayed on the display panel is transmitted to an external device presently connected to the display device.

17. The display device of claim 13, wherein when the first substrate and the second substrate of the touch device are simultaneously touched and are dragged in a specific direction, an image being displayed on the display panel is captured or scanned.

18. The display device of claim 13, wherein when the second substrate of the touch device is touched in more than a predetermined area and then dragged in a first direction, an object being displayed on the display panel is copied to a clipboard.

19. The display device of claim 18, wherein when the second substrate of the touch device is touched more than a predetermined area and then dragged in a second direction, the object copied in the clipboard is pasted on the display panel.

20. The display device of claim 13, wherein when the second substrate of the touch device is touched at more than a predetermined area and dragged in a zigzag direction, at least one part of information being displayed on the display panel is removed.

21. The display device of claim 13, wherein when a plurality of points on the second substrate of the touch device are touched for more than a predetermined period of time, a ruler for measuring length is displayed between points.

* * * * *